(12) United States Patent
Tobinai

(10) Patent No.: US 9,449,215 B2
(45) Date of Patent: Sep. 20, 2016

(54) INFORMATION PROCESSING APPARATUS, INFORMATION PROCESSING METHOD AND INFORMATION PROCESSING PROGRAM

(71) Applicant: Rakuten, Inc., Tokyo (JP)

(72) Inventor: Hideaki Tobinai, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/388,938

(22) PCT Filed: Feb. 28, 2013

(86) PCT No.: PCT/JP2013/055502
§ 371 (c)(1),
(2) Date: Sep. 29, 2014

(87) PCT Pub. No.: WO2013/161383
PCT Pub. Date: Oct. 31, 2013

(65) Prior Publication Data
US 2015/0063704 A1 Mar. 5, 2015

(30) Foreign Application Priority Data

Apr. 27, 2012 (JP) ................................. 2012-103677

(51) Int. Cl.
*G06K 9/46* (2006.01)
*G06K 9/00* (2006.01)
*G06F 17/30* (2006.01)

(52) U.S. Cl.
CPC ..... *G06K 9/00281* (2013.01); *G06F 17/30247* (2013.01); *G06K 9/00221* (2013.01)

(58) Field of Classification Search
CPC ............ G06K 9/00281; G06K 9/6202; G06T 7/0081; G06F 17/30265
USPC ........................................ 382/195, 218, 305
See application file for complete search history.

(56) References Cited

U.S. PATENT DOCUMENTS

2008/0144891 A1 6/2008 Hwang et al.
2010/0135584 A1* 6/2010 Tang ................. G06F 17/30247
382/218

FOREIGN PATENT DOCUMENTS

| JP | 2003-178304 A | 6/2003 |
| JP | 2004-192213 A | 7/2004 |
| JP | 2006-318375 A | 11/2006 |
| JP | 2008-152789 A | 7/2008 |
| JP | 2009-237627 A | 10/2009 |
| JP | 2010-250636 A | 11/2010 |

OTHER PUBLICATIONS

International Search Report for PCT/JP2013/055502 dated May 14, 2013.

* cited by examiner

*Primary Examiner* — Ruiping Li
(74) *Attorney, Agent, or Firm* — Sughrue Mion, PLLC

(57) ABSTRACT

Information corresponding to a face image preferred by a user as a whole is presented while considering a face element preferred by the user. An information processing apparatus identifies a priority of each of a plurality of elements included in a face in a reference face image. The priority is according to specification by a user. The information processing apparatus extracts, from among a plurality of face images, face images whose similarities of an area including the plurality of elements to the reference face image is greater than or equal to a first threshold value. The information processing apparatus decides, on the basis of similarities of each element between the reference face image and the extracted face images and the identified priority of each element, presentation order of presentation information presented as search results corresponding to the extracted face images.

17 Claims, 16 Drawing Sheets

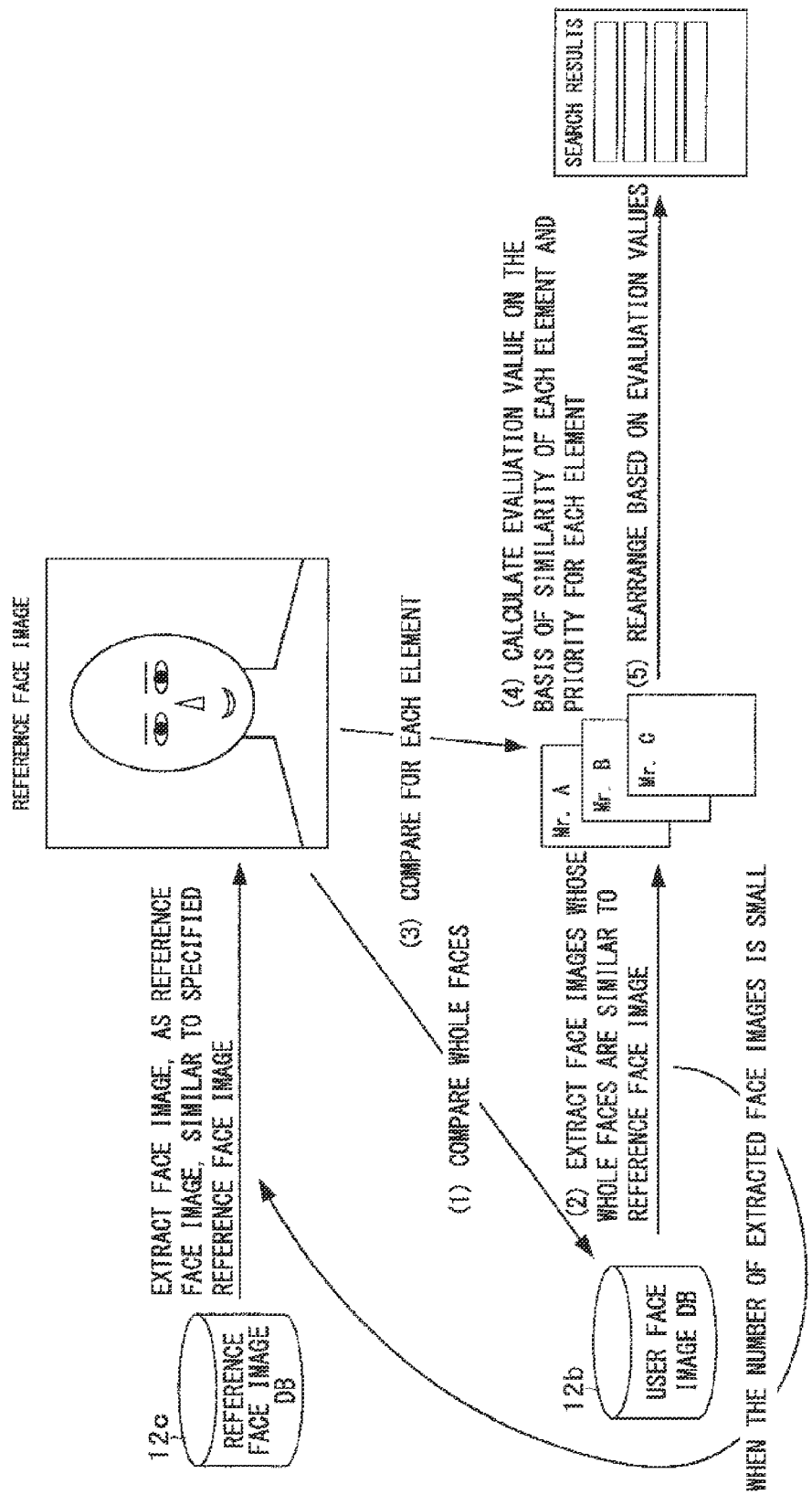

FIG.4

| USER | ELEMENT | SIMILARITY | PRIORITY | EVALUATION VALUE |
|---|---|---|---|---|
| A | EYEBROWS | 2 | 5% | 0.1 |
| | EYES | 10 | 80% | 8.0 |
| | NOSE | 4 | 10% | 0.4 |
| | MOUTH | 2 | 5% | 0.1 |
| | SUM OF EVALUATION VALUES | | | 8.6 |

| USER | ELEMENT | SIMILARITY | PRIORITY | EVALUATION VALUE |
|---|---|---|---|---|
| B | EYEBROWS | 8 | 5% | 0.4 |
| | EYES | 7 | 80% | 5.6 |
| | NOSE | 9 | 10% | 0.9 |
| | MOUTH | 10 | 5% | 0.5 |
| | SUM OF EVALUATION VALUES | | | 7.4 |

| USER | ELEMENT | SIMILARITY | PRIORITY | EVALUATION VALUE |
|---|---|---|---|---|
| C | EYEBROWS | 2 | 5% | 0.1 |
| | EYES | 6 | 80% | 4.8 |
| | NOSE | 4 | 10% | 0.4 |
| | MOUTH | 10 | 5% | 0.5 |
| | SUM OF EVALUATION VALUES | | | 5.8 |

| USER | ELEMENT | SIMILARITY | PRIORITY | EVALUATION VALUE |
|---|---|---|---|---|
| D | EYEBROWS | 2 | 5% | 0.1 |
| | EYES | 6 | 80% | 4.8 |
| | NOSE | 4 | 10% | 0.4 |
| | MOUTH | 4 | 5% | 0.2 |
| | SUM OF EVALUATION VALUES | | | 5.5 |

| USER | ELEMENT | SIMILARITY | PRIORITY | EVALUATION VALUE |
|---|---|---|---|---|
| E | EYEBROWS | 2 | 5% | 0.1 |
| | EYES | 5 | 80% | 4.0 |
| | NOSE | 4 | 10% | 0.4 |
| | MOUTH | 10 | 5% | 0.5 |
| | SUM OF EVALUATION VALUES | | | 5.0 |

FIG.9A
MEMBER INFORMATION DB — 12a

| USER ID |
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |
| PROFILE |

FIG.9B
USER FACE IMAGE DB — 12b

| USER ID |
| FACE IMAGE |

FIG.9C
REFERENCE FACE IMAGE DB — 12c

| IMAGE ID |
| FACE IMAGE |

FIG.9D
SEARCH HISTORY DB — 12d

| USER ID |
| DATE AND TIME OF SEARCH |
| IMAGE ID |
| PRIORITY OF EACH ELEMENT |

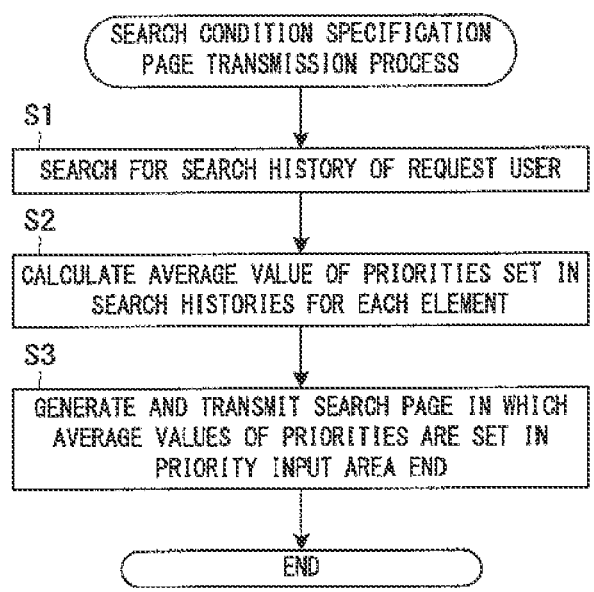

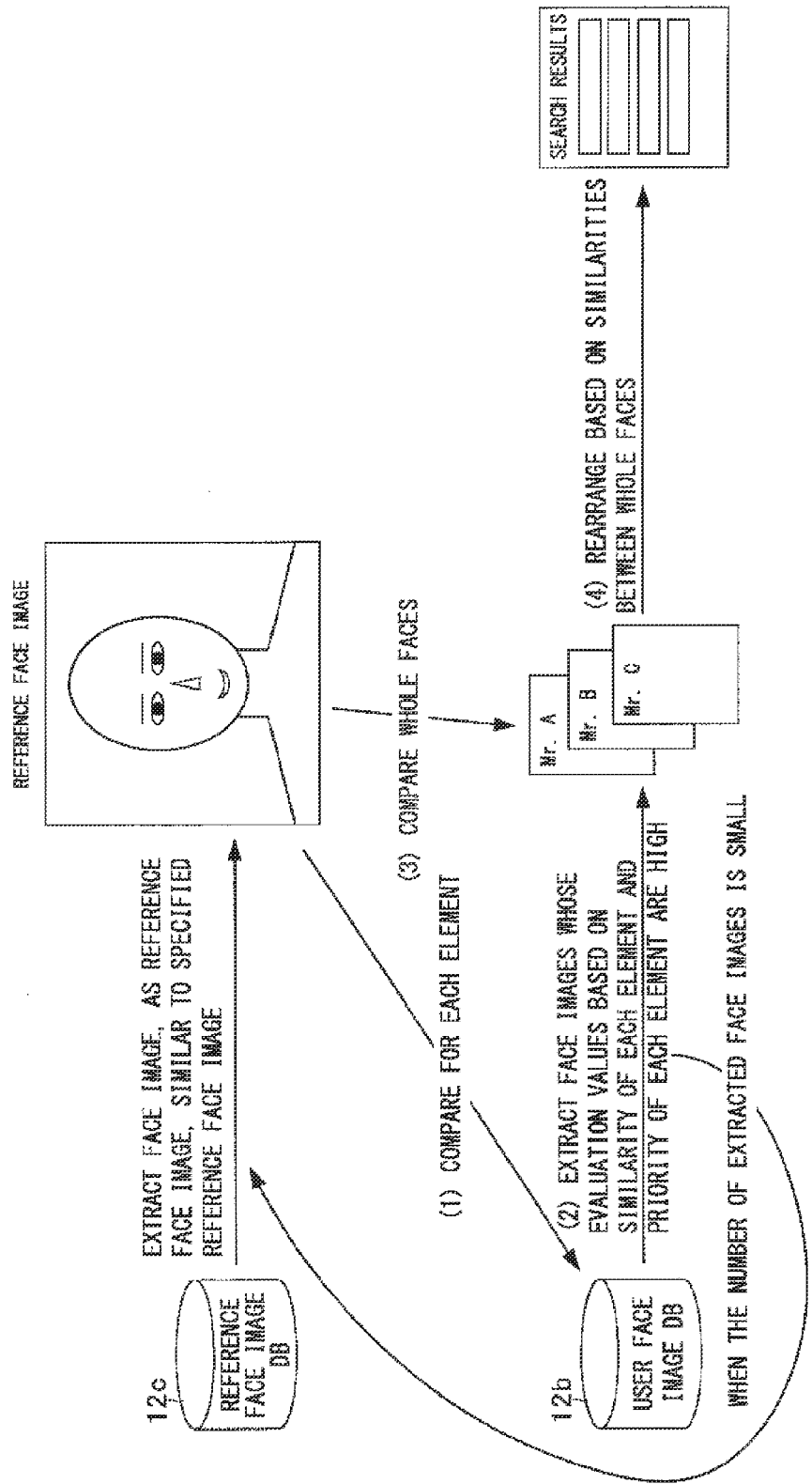

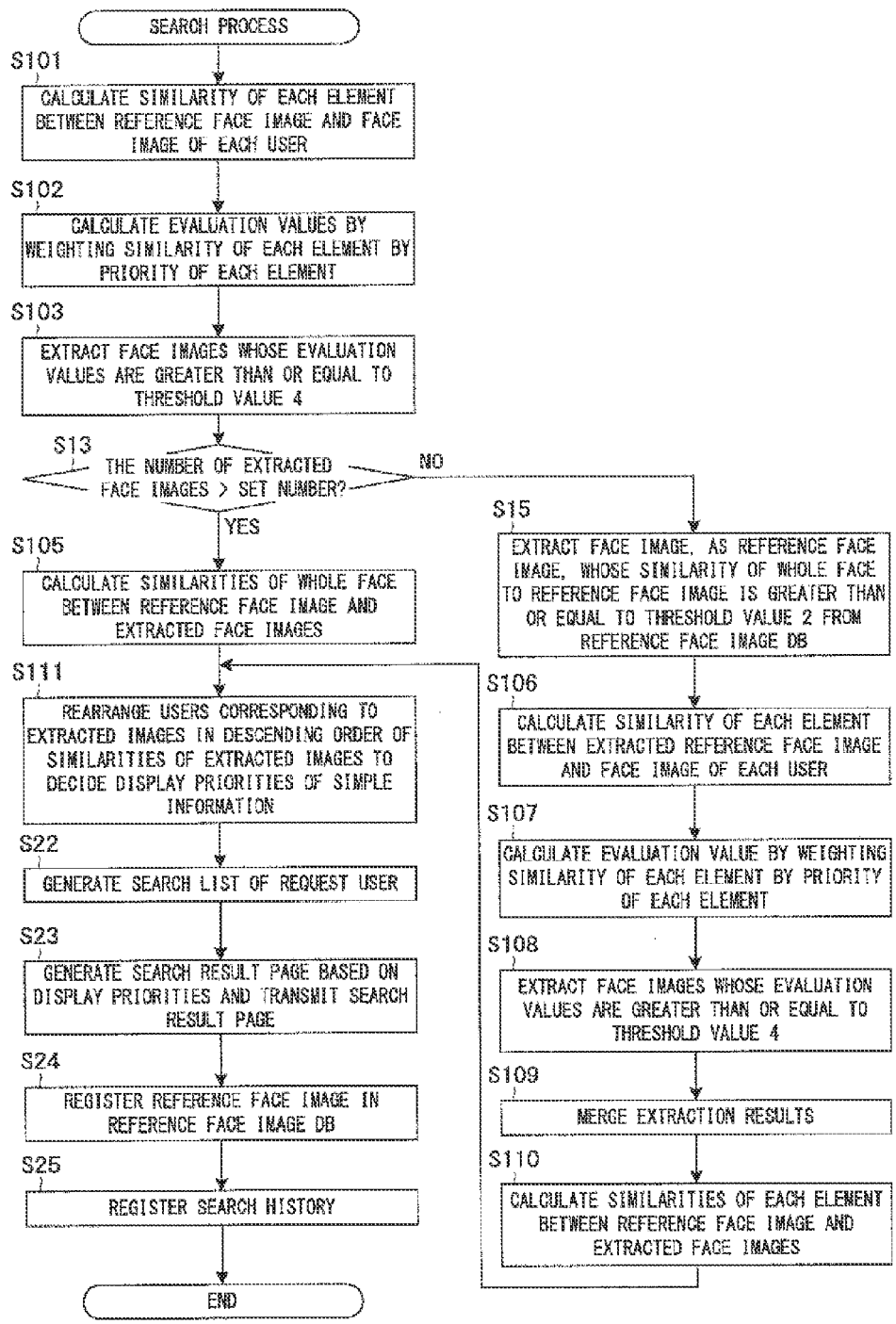

INFORMATION PROCESSING APPARATUS, INFORMATION PROCESSING METHOD AND INFORMATION PROCESSING PROGRAM

CROSS REFERENCE TO RELATED APPLICATIONS

This application is a National Stage of International Application No. PCT/JP2013/055502 filed Feb. 28, 2013, claiming priority based on Japanese Patent Application No. 2012-103677 filed Apr. 27, 2012, the contents of all of which are incorporated herein by reference in their entirety.

TECHNICAL FIELD

The present invention relates to a technical field of an information processing apparatus and an information processing method that compare a reference face image with a plurality of face images and causes information corresponding to a face image similar to the reference face image to be presented.

BACKGROUND ART

Conventionally, a technique is known which compares a reference face image with a plurality of face images and causes information corresponding to a face image similar to the reference face image to be presented. In this technique, there are various methods of comparison between the reference face image and a plurality of face images.

For example, Patent Literature 1 discloses a technique which extracts parts of a face such as eyes and mouth from a face image, extracts a feature amount of the face based on an extraction result, obtains a correlation value between face images based on the extracted feature amounts, and outputs a face image with a maximum correlation value. The technique disclosed in Patent Literature 1 basically uses a whole face as an object to be compared.

On the other hand, Patent Literature 2 discloses a technique which collates a face image part file corresponding to a part specified by a user in a face with face image part files stored in a database, selects a plurality of face image part files in descending order of similarity, and causes a whole face image corresponding to face image part data to be displayed as a search result. The technique disclosed in Patent Literature 2 basically uses only a part of elements included in a face as an object to be compared.

CITATION LIST

Patent Literatures

Patent Literature 1: JP 2003-178304 A
Patent Literature 2: JP 2004-192213 A

SUMMARY OF INVENTION

Technical Problem

However, regarding the similarity of face images, the technique described in Patent Literature 1 considers a whole face, but does not consider a part of elements included in a face. On the other hand, the technique described in Patent Literature 2 considers a part of elements included in a face, but does not consider a whole face. Therefore, it is difficult for both of the techniques to extract a face image preferred by a user as a whole while considering a face element preferred by the user.

The present invention is made in view of the above situation, and an object of the present invention is to provide an information processing apparatus, an information processing method, and an information processing program which can cause information corresponding to a face image preferred by a user as a whole to be presented while considering a face element preferred by the user.

Solution to Problem

In order to solve the above problem, the invention according to claim 1 is an information processing apparatus comprising: a priority identification means that identifies a priority of each of a plurality of elements included in a face in a reference face image, the priority being according to specification by a user; a first extraction means that extracts, from among a plurality of face images, face images whose similarities of an area including the plurality of elements to the reference face image are greater than or equal to a first threshold value; and a presentation order decision means that decides, on the basis of similarities of each element between the reference face image and the extracted face images and the priority of each element which is identified by the priority identification means, presentation order of presentation information presented as search results corresponding to the face images extracted by the first extraction means.

According to this invention, the presentation order of the presentation information corresponding to the face images similar to the reference face image as a whole is decided based on the similarities of each element between the reference face image and the extracted face images and the priorities according to the specification by the user. Therefore, it is possible to cause information to be presented by prioritizing a face element preferred by the user from among faces preferred by the user. In other words, it is possible to cause information corresponding to a face image preferred by the user as a whole to be presented while considering a face element preferred by the user.

The invention according to claim 2 is an information processing apparatus comprising: a priority identification means that identifies a priority of each of a plurality of elements included in a face in a reference face image, the priority being according to specification by a user; a first extraction means that extracts, from among a plurality of face images, face images whose index values based on similarities of each element to the reference face image and the priority of each element identified by the priority identification means are greater than or equal to a second threshold value; and a presentation order decision means that decides, on the basis of similarities of an area including the plurality of elements between the reference face image and the extracted face images, presentation order of presentation information presented as search results corresponding to the face images extracted by the first extraction means.

According to this invention, the face images whose index value based on the similarities of each element to the reference face image and the priorities according to the specification by the user is greater than or equal to the threshold value are extracted. Then, the presentation order of the presentation information corresponding to the extracted face images is decided based on the degree to which the extracted face images is similar to the reference face image as a whole. Therefore, it is possible to cause information to be presented by prioritizing a face preferred by the user from among faces including an element preferred by the user. In other words, it is possible to cause information corresponding to a face image preferred by the user as a whole to be presented while considering a face element preferred by the user.

The invention according to claim 3 is the information processing apparatus according to claim 1, wherein the presentation information includes the face images extracted by the first extraction means, and the information processing apparatus further includes a presentation information identification means that identifies a piece selected by the user from among a plurality of pieces of the presented presentation information, a first determination means that determines whether or not the selected piece of the presentation information is a piece whose position in the presentation order is decided by the presentation order decision means to be lower than that of a piece, of the presentation information, that has not yet been selected, a second determination means that determines whether or not an element with a highest similarity in a face image corresponding to the selected piece of the presentation information and an element with a highest priority of priorities identified by the priority identification means are different from each other, and a first presentation means that, when the first determination means determines that the selected piece is the piece whose position is decided to be lower than that of the piece that has not yet been selected and the second determination means determines that the element with the highest similarity and the element with the highest priority are different from each other, causes information to be presented which recommends increasing the priority of the element with the highest similarity in the face image corresponding to the selected piece of the presentation information.

When the user does not select pieces of the presentation information in the same order as the presentation order, but selects a part, of presentation information, corresponding to a face image whose element with the highest similarity to the reference image is different from an element with the highest priority, there is a probability that an element which the user thought they preferred is different from an element which the user actually prefers. According to this invention, the information which recommends increasing the priority of the element with the highest similarity in the face image corresponding to the selected piece of the presentation information is presented. Therefore, the user can know the element preferred but not realized by the user.

The invention according to claim 4 is the information processing apparatus according to claim 3, further comprising: a second presentation means that, when the first determination means determines that the selected piece is the piece whose position is decided to be lower than that of the piece that has not yet been selected and the second determination means determines that the element with the highest similarity and the element with the highest priority are different from each other, causes a ratio of a similarity of each element in the face image corresponding to the selected piece of the presentation information to be presented.

According to this invention, the ratio of similarity of each element in the face image corresponding to the selected piece of the presentation information is presented. Therefore, the user can know the ratio of preference which the user has not realized for each element.

The invention according to claim 5 is the information processing apparatus according to claim 1, wherein the presentation information includes the face images extracted by the first extraction means, and the information processing apparatus further includes a presentation information identification means that identifies a piece selected by the user from among a plurality of pieces of the presented presentation information, a first determination means that determines whether or not the selected piece of the presentation information is a piece whose position in the presentation order is decided by the presentation order decision means to be lower than that of a piece, of the presentation information, that has not yet been selected, a second determination means that determines whether or not an element with a highest similarity in a face image corresponding to the selected piece of the presentation information and an element with a highest priority of priorities identified by the priority identification means are different from each other, and an appearance control means that, when the first determination means determines that the selected piece is the piece whose position is decided to be lower than that of the piece that has not yet been selected and the second determination means determines that the element with the highest similarity and the element with the highest priority are different from each other, causes an appearance of a piece, among the plurality of pieces of the presentation information, corresponding to a face image whose element with a highest similarity is the same as that of a face image corresponding to the selected piece of the presentation information to be different from appearances of the other pieces of the presentation information.

According to this invention, the presentation information is presented such that an appearance of a piece, of the presentation information, corresponding to a face image whose element with the highest similarity is the same as that of a face image corresponding to the selected piece of the presentation information is different from appearances of the other pieces of the presentation information. Therefore, the user can easily find a face image including an element preferred but not realized by the user.

The invention according to claim 6 is the information processing apparatus according to any one of claims 1 to 5, wherein the first extraction means extracts face images by using a face image specified by the user as the reference face image, the information processing apparatus further includes a second extraction means that, when the number of face images extracted by the first extraction means is smaller than or equal to a predetermined number, extracts a face image, from among face images specified as the reference face images in the past, whose similarity to the face image specified by the user is greater than or equal to a third threshold value, and the first extraction means extracts face images by further using the face image extracted by the second extraction means as the reference face image.

According to this invention, even when a sufficient number of face images cannot be extracted by using only the reference face image specified by the user, it is possible to extract face images similar to the preference of the user.

The invention according to claim 7 is the information processing apparatus according to any one of claims 1 to 6, further comprising: a priority decision means that decides the priority of each element on the basis of a history, stored in a storage means, of priority specification of the user; and a display control means that causes an input area in which the priority decided for each element by the priority decision means is set to be displayed as an input area for the user to specify the priority of each element, wherein the priority identification means acquires the priority specified for each element in the input area.

According to this invention, the priorities are automatically set in the input area based on the specification of the priorities by the user in the past. Therefore, it is possible to reduce the time and effort for the user to specify the priorities.

The invention according to claim 8 is the information processing apparatus according to any one of claims 1 to 6, wherein the first extraction means extracts face images by using a face image, as the reference face image, specified by the user together with the priority of each element, the information processing apparatus further includes a third extraction means that extracts, from among face images specified by the user in the past, a face image whose similarity to the face image specified by the user at this time is greater than or equal to a fourth threshold value, and a display control means that causes an input area in which a priority specified for each element by the user in the past together with the face image extracted by the third extraction means is set to be displayed as an input area for the user to specify the priority of each element, and the priority identification means acquires the priority specified for each element in the input area.

According to this invention, the priorities specified by the user together with, among the face images specified by the user in the past, a face image similar to the face image specified at this time are automatically set in the input area. Therefore, it is possible to reduce the time and effort for the user to specify the priorities.

The invention according to claim 9 is an information processing method performed by a computer, the method comprising: a priority identification step of identifying a priority of each of a plurality of elements included in a face in a reference face image, the priority being according to specification by a user; a first extraction step of extracting, from among a plurality of face images, face images whose similarities of an area including the plurality of elements to the reference face image are greater than or equal to a first threshold value; and a presentation order decision step of deciding, on the basis of similarities of each element between the reference face image and the extracted face images and the priority of each element which is identified in the priority identification step, presentation order of presentation information presented as search results corresponding to the face images extracted in the first extraction step.

The invention according to claim 10 is an information processing method performed by a computer, the method comprising: a priority identification step of identifying a priority of each of a plurality of elements included in a face in a reference face image, the priority being according to specification by a user; a first extraction step of extracting, from among a plurality of face images, face images whose index values based on similarities of each element to the reference face image and the priority of each element identified in the priority identification step are greater than or equal to a second threshold value; and a presentation order decision step of deciding, on the basis of similarities of an area including the plurality of elements between the reference face image and the extracted face images, presentation order of presentation information presented as search results corresponding to the face images extracted in the first extraction step.

The invention according to claim 11 is an information processing program that causes a computer to function as: a priority identification means that identifies a priority of each of a plurality of elements included in a face in a reference face image, the priority being according to specification by a user; a first extraction means that extracts, from among a plurality of face images, face images whose similarities of an area including the plurality of elements to the reference face image are greater than or equal to a first threshold value; and a presentation order decision means that decides, on the basis of similarities of each element between the reference face image and the extracted face images and the priority of each element which is identified by the priority identification means, presentation order of presentation information presented as search results corresponding to the face images extracted by the first extraction means.

The invention according to claim 12 is an information processing program that causes a computer to function as: a priority identification means that identifies a priority of each of a plurality of elements included in a face in a reference face image, the priority being according to specification by a user; a first extraction means that extracts, from among a plurality of face images, face images whose index values based on similarities of each element to the reference face image and the priority of each element identified by the priority identification means are greater than or equal to a second threshold value; and a presentation order decision means that decides, on the basis of similarities of an area including the plurality of elements between the reference face image and the extracted face images, presentation order of presentation information presented as search results corresponding to the face images extracted by the first extraction means.

In the recording medium related to the present invention, an information processing program is computer-readably recorded, the information processing program causing a computer to function as: a priority identification means that identifies a priority of each of a plurality of elements included in a face in a reference face image, the priority being according to specification by a user; a first extraction means that extracts, from among a plurality of face images, face images whose similarities of an area including the plurality of elements to the reference face image are greater than or equal to a first threshold value; and a presentation order decision means that decides, on the basis of similarities of each element between the reference face image and the extracted face images and the priority of each element which is identified by the priority identification means, presentation order of presentation information presented as search results corresponding to the face images extracted by the first extraction means.

In the recording medium related to the present invention, an information processing program is computer-readably recorded, the information processing program causing a computer to function as: a priority identification means that identifies a priority of each of a plurality of elements included in a face in a reference face image, the priority being according to specification by a user; a first extraction means that extracts, from among a plurality of face images, face images whose index values based on similarity of each element to the reference face image and the priority of each element identified by the priority identification means are greater than or equal to a second threshold value; and a presentation order decision means that decides, on the basis of similarities of an area including the plurality of elements between the reference face image and the extracted face images, presentation order of presentation information presented as search results corresponding to the face images extracted by the first extraction means.

Advantageous Effects of Invention

According to the present invention, the presentation order of the presentation information corresponding to the face images similar to the reference face image as a whole is decided based on the similarities of each element between the reference face image and the extracted face images and the priorities according to the specification by the user. Therefore, it is possible to cause information to be presented by prioritizing a face element preferred by the user from among faces preferred by the user. In other words, it is possible to cause information corresponding to a face image preferred by the user as a whole to be presented while considering a face element preferred by the user.

BRIEF DESCRIPTION OF DRAWINGS

FIG. 3 is a diagram showing an example of an overview of a process of an information providing server 1 according to an embodiment.

FIG. 4 is a diagram showing a calculation example of an evaluation value.

FIG. 9A is a diagram showing an example of content registered in a member information DB 12a. FIG. 9B is a diagram showing an example of content registered in a user face image DB 12b. FIG. 9C is a diagram showing an example of content registered in a reference face image DB 12c. FIG. 9D is a diagram showing an example of content registered in a search history DB 12d.

FIG. 10 is a flowchart showing a process example of a search condition specification page transmission process of a system control unit 14 of the information providing server 1 according to an embodiment.

FIG. 15 is a diagram showing an example of an overview of a process of an information providing server 1 according to an embodiment.

FIG. 16 is a flowchart showing a process example of a search process of a system control unit 14 of the information providing server 1 according to an embodiment.

DESCRIPTION OF EMBODIMENTS

Hereinafter, embodiments of the present invention will be described in detail with reference to the drawings. The embodiments described below are embodiments where the present invention is applied to an information processing system.

Figure 1:
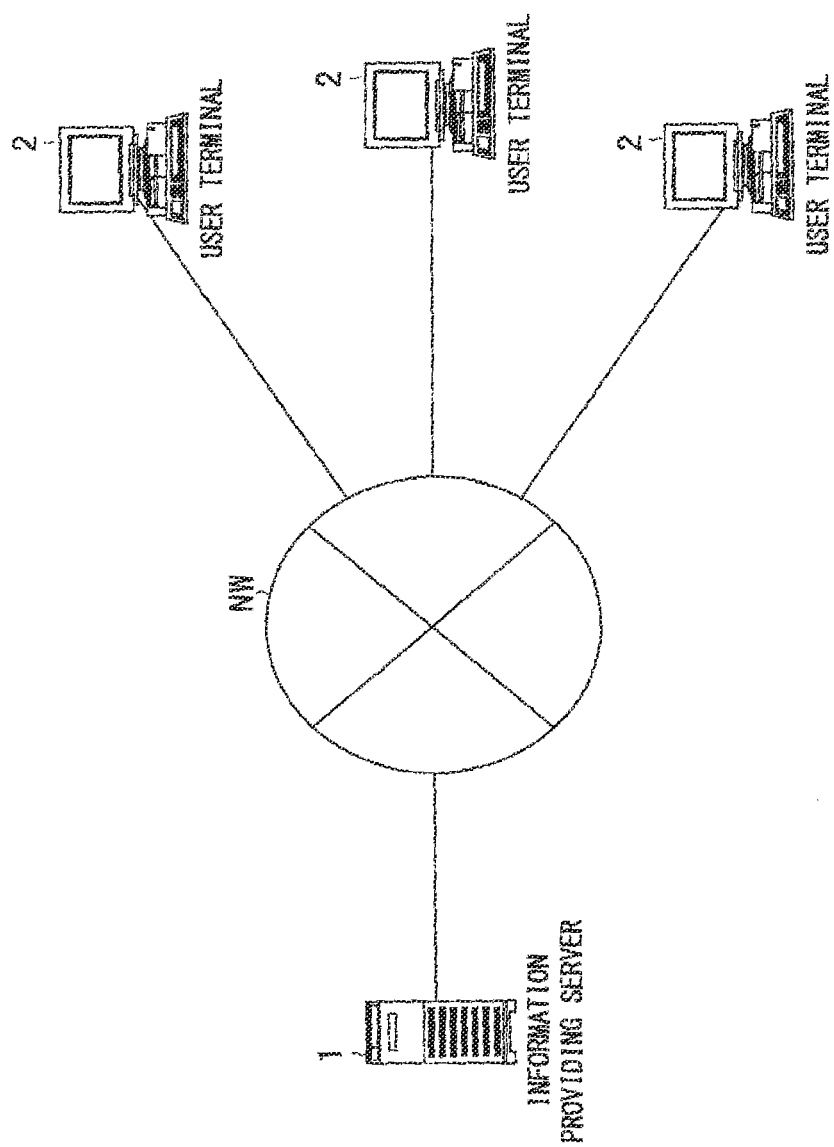
FIG. 1 is a diagram showing an example of a schematic configuration of an information processing system S according to an embodiment.

1. First Embodiment 1-1. Schematic Configuration and Function of Information Processing System First, a configuration of an information processing system S according to the present embodiment will be described with reference to FIGS. 1 to 7. FIG. 1 is a diagram showing an example of a schematic configuration of the information processing system S according to the present embodiment.

As shown in FIG. 1, the information processing system S includes an information providing server 1 and a plurality of user terminals 2. The information providing server 1 and each user terminal 2 can transmit and receive data to and from each other through a network NW by using, for example, TCP/IP as a communication protocol. The network NW includes, for example, the Internet, a dedicated communication line (e.g., a CATV (Community Antenna Television) line), a mobile communication network (including a base station and the like), and a gateway.

The information providing server 1 is a server device that performs various processes related to an information providing site. The information providing site is a website for introducing other users to a user registered with the information providing site as a member. The information providing site is, for example, a website of a marriage consulting agency. In the information providing site, the user can specify a face image representing a face which the user prefers. The information providing server 1 defines the specified face image as a reference face image. The information providing server 1 searches for a user whose face is similar to the face preferred by the user who specified the face image from among a plurality of users registered as members on the basis of the reference face image. Then, the information providing server 1 causes the user terminal 2 to present information of a found user to the user.

The user terminal 2 is a terminal device of a user who uses the information providing site. The user terminal 2 receives a web page from the information providing server 1 and displays the web page by accessing the information providing server 1 on the basis of an operation from the user. In the user terminal 2, software such as a browser and an email client is installed. For example, a personal computer, a PDA (Personal Digital Assistant), a mobile information terminal such as a smartphone, and a mobile phone are used as the user terminal 2.

Figure 2:
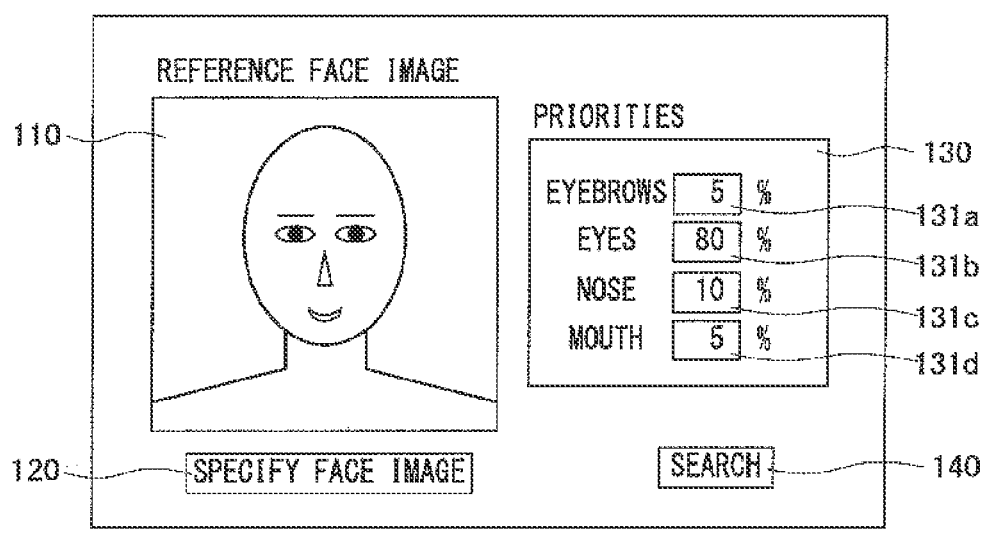
FIG. 2 is a diagram showing a display example of a search condition specification page.

Next, a user search method using face images and a display method of search results will be described. FIG. 2 is a diagram showing a display example of a search condition specification page. The search condition specification page is a web page for specifying a condition to search for users. A user who specifies the condition and requests a search is referred to as a "request user". In the search condition specification page, the request user can specify a face image representing his or her favorite face as a reference face image. Further, the user can specify a priority for each of a plurality of elements included in a face in the reference face image. The priority indicates how much the request user puts importance on a corresponding face element. The higher the degree of importance that the request user puts on the element, the higher the priority. In the reference face image, the request user can make the priority of a particularly favorite face element higher than the priorities of other elements.

As shown in FIG. 2, the search condition specification page includes a reference face image display area 110, a reference face image specification button 120, a priority setting area 130, and a search button 140. In the reference face image display area 110, the reference face image specified by the request user is displayed.

When the request user selects the reference face image specification button 120, a window for specifying the reference face image is displayed. In this window, the request user specifies, for example, a face image stored in the user terminal 2. Then, the specified face image is displayed as the reference face image in the reference face image display area 110. For example, the information providing server 1 may be configured so that the information providing server 1 stores a plurality of face images to be candidates for the reference face image and the request user can select the reference face image from among the face images stored in the information providing server 1. Alternatively, for example, the information providing server 1 may be configured so that when the request user inputs a name of a celebrity, the information providing server 1 searches for face images of the celebrity with the input name and the request user can select the reference face image from among found face images.

The priority setting area 130 includes a plurality of priority input areas 131 (131*a* to 131*d*). Each priority input area 131 is an area for inputting a priority. Each priority input area 131 is an example of an input area of the present invention. The priority input areas 131*a*, 131*b*, 131*c*, and 131*d* correspond to eyebrows, eyes, nose, and mouth, respectively. The user can specify the priority for each of eyebrows, eyes, nose, and mouth. The priority can be specified in percent. The sum of the priorities of all the elements is 100%. The format of the priority that can be specified is not limited to percent. For example, the priority can be specified by a score or a symbol such as double circle, circle, triangle, and x mark. The input area for specifying the priority may be, for example, a slide bar or a select box. The elements of a face for which the priority can be specified are not limited to eyebrows, eyes, nose, and mouth. For example, the priority may be able to be specified for ears and a face contour. Further, the priority may be able to be specified for head in addition to the elements of a face. The search button 140 is a button to request the information providing server to perform search.

FIG. 3 is a diagram showing an example of an overview of a process of the information providing server 1 according to the present embodiment. When the information providing server 1 is requested to perform search, the information providing server 1 compares a whole face of the reference face image with a whole face of a face image of each user (FIG. 3 (1)). The face image of each user is stored in a user face image DB 12*b* included in the information providing server 1. The "DB" is an abbreviation for database. Here, the whole image may be an area including at least all of a plurality of elements for which the priority can be specified. For example, when the priorities of eyebrows, eyes, nose, and mouth can be specified, the whole face includes all of eyebrows, eyes, nose, and mouth. On the other hand, the whole image may include, but need not include, ears, face contour, and head.

The information providing server 1 extracts face images of users whose whole faces are similar to the reference face image on the basis of a comparison result (FIG. 3 (2)). The face image extracted here is referred to as an "extracted face image".

Next, the information providing server 1 compares the reference face image with the extracted face images for each element (FIG. 3 (3)). Then, the information providing server 1 calculates a similarity of each element. Next, the information providing server 1 calculates an evaluation value for each extracted face image on the basis of the similarity of each element and the priority of each element specified by the request user (FIG. 3 (4)).

FIG. 4 is a diagram showing a calculation example of the evaluation value. The information providing server 1 calculates a weighted similarity by multiplying the similarity of each element by a corresponding priority. The weighted similarity is an evaluation value for each element. Then, the information providing server 1 calculates an evaluation value of a face image by summing up the evaluation values of respective elements. Therefore, the similarity of an element whose priority is high affects the evaluation value more than the similarity of an element whose priority is low. The evaluation value is an example of an index value of the present invention.

As illustrated in FIG. 4, it is assumed that the priorities of eyebrows, eyes, nose, and mouth, which are specified by the request user, are, for example, 5%, 80%, 10%, and 5%, respectively. Further, it is assumed that face images of users A to E are extracted as face images similar to the reference face image. The similarity of each element has 10 steps from 1 to 10.

The similarities of eyebrows, eyes, nose, and mouth of the user A are 2, 10, 4, and 2, respectively. Therefore, the evaluation value of the user A is 8.6 (=2×5%+10×80%+4×10%+2×5%). The similarities of the user B are 8, 7, 9, and 10. Therefore, the evaluation value is 7.4. The similarities of the user C are 2, 6, 4, and 10. Therefore, the evaluation value is 5.8. The similarities of the user D are 2, 6, 4, and 4. Therefore, the evaluation value is 5.5. The similarities of the user E are 2, 5, 4, and 10. Therefore, the evaluation value is 5.0.

Figure 5:
FIG. 5 is a diagram showing a display example of a search result page.

The information providing server 1 rearranges search results on the basis of the evaluation values (FIG. 3 (5)). Specifically, the information providing server 1 determines display priorities so that the higher the evaluation value of a face image, the higher the display priority of information of a user corresponding to the face image. FIG. 5 is a diagram showing a display example of a search result page. The search result page is a web page on which a list of found users is displayed. As shown in FIG. 5, a plurality of pieces of simple information 210*x* (x=a, b, c, and so on) are displayed in the search result page. The simple information 210*x* is simple information of a found user. For example, the simple information 210*x* includes a face image 211 of the user, a nickname, and a simple profile. The simple information 210*x* is displayed for each found user. As described above, the evaluation values of the users A, B, C, D, and E are in descending order. Therefore, pieces of the simple information 210*x* are arranged from the top in order of the users A, B, C, D, and E and displayed. The suffix x of the symbol 210*x* corresponds to the nickname of the user. For example, simple information 210*a* corresponds to the user A and simple information 210*b* corresponds to the user B. The simple information 210*x* is an example of presentation information of the present invention. The display priority is an example of a position in presentation order of the present invention.

For example, the user A and the user B are compared. A simple sum of the similarities of a plurality of elements of the user A is 18. On the other hand, a simple sum of the similarities of a plurality of elements of the user B is 31. There is a probability that the sum of similarities of a plurality of elements and the similarity of a whole face correlate to each other. Therefore, there is a probability that the face of the user B is more similar to the reference face image than the face of the user A when comparing whole faces of the users A and B with a whole face represented by the reference face image. However, in eyes whose priority is high, the similarity of the user A is higher than that of the user B. On the other hand, the priorities of elements other than eyes are considerably lower than the priority of eyes. Therefore, the display priority of the user A is higher than that of the user B. By the process described with reference to FIG. 3, the information providing server 1 can cause information to be presented by prioritizing a face element preferred by the request user from among faces preferred by the request user.

It may be allowed that the information providing server 1 does not rearrange pieces of the simple information 210x based on the evaluation values when causing the search result page to be displayed at first and the information providing server 1 rearranges the pieces of the simple information 210x when a user may perform an rearrangement operation on the search result page then to cause the search result page to be redisplayed.

By the way, in (2) of FIG. 3, there is a case in which the number of extracted face images similar to the reference face image specified by the request user is small. In this case, the information providing server 1 performs a process to increase the number of extracted face images. In a reference face image DB 12c included in the information providing server 1, face images specified in the past by each user as reference face images are registered. Therefore, the information providing server 1 extracts face images whose whole faces are similar to the specified reference face image from the reference face image DB 12c. Then, the information providing server 1 adds the extracted face images to the reference face image. Then, the information providing server 1 extracts user's face images similar to at least any one of a plurality of reference face images including the specified reference face image and the extracted reference face images.

It can be considered that each user tends to specify a face image of a celebrity as the reference face image. Therefore, a person whose face is represented by the extracted reference face image may be the same person whose face is represented by the specified reference face image. Therefore, it is possible to extract a user's face whose expression is similar to any one of a plurality of facial expressions of the same person. For example, even when a certain user's face is not similar to an expression represented by the specified reference face image, the user's face may be similar to an expression represented by the extracted reference face image. Therefore, it is possible to search for users whose faces are similar to the face specified by the reference face image.

Next, information presentation based on selection of the simple information 210x by the request user on the search result page will be described.

When the request user selects desired simple information 210x on the search result page shown in FIG. 5, a detailed information page is displayed. The detailed information page is a web page in which detailed information of a user corresponding to the selected simple information 210x is displayed. The more similar is the element preferred by the request user, which is identified by the priority for each element specified by the request user, in a face of a user to that of the face represented by the reference face image, the higher is the display priority of the simple information 210x of the user. The face image 211 is displayed in the simple information 210x, so that it can be considered that the request user normally selects pieces of the simple information 210x in descending order of the display priority. However, the request user may select pieces of the simple information 210x in other than descending order of the display priority. For example, this is the case in which the user realizes that the user prefers the face image 211 of the simple information 210x of lower priority to the face image 211 of the simple information 210x of higher priority as a result of seeing the face images 211. Therefore, when the request user selects the simple information 210x whose display priority is lower than that of the simple information 210x that has not yet been selected and the element whose similarity is the highest in the face image 211 of the selected simple information 210x is different from the element with the highest priority specified by the request user from among a plurality of elements, the information providing server 1 causes information that recommends changing the priority specification to be presented. Here, the face image 211 of the selected simple information 210x is referred to as a "selected face image". The element whose similarity is the highest in the face image is referred to as a "highest similarity element". The element with the highest priority specified by the request user is referred to as a "highest priority element". Specifically, the information providing server 1 causes information that recommends making the priority of the highest similarity element higher than the priority of the highest priority element to be presented.

Figure 6:
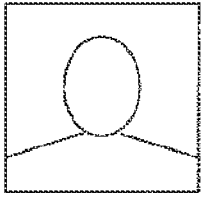
FIG. 6 is a display example of a detailed information page.

FIG. 6 is a display example of the detailed information page. For example, in the search result page shown in FIG. 5, it is assumed that the request user moves a mouse pointer MP and selects the simple information 210c without selecting any of the simple information 210a and 210b. Then, as shown in FIG. 6, the detailed information page of the user C is displayed. In the detailed information page, detailed information of the user and a search result re-display link 310 are displayed. The search result re-display link 310 is a link to display again the search result page which had been displayed previously.

In the example shown in FIG. 4, the highest priority element is eyes. On the other hand, the highest similarity element of the face image of the user C is mouth. Therefore, the highest priority element and the highest similarity element are different from each other, so that a priority change recommendation message 320 and a similarity ratio display area 330 are further displayed in the detailed information page. The priority change recommendation message 320 is a message that recommends changing the specification of the priorities. As the priority change recommendation message 320, for example, "Is it better to make the priority of mouth higher than the priority of eyes?" is displayed. By seeing the priority change recommendation message 320, the request user can know the element which is preferred but is not realized by the request user. In the similarity ratio display area 330, the similarity ratio of each element to the sum of similarities of a plurality of elements in a face is displayed. The similarity ratios of eyebrows, eyes, nose, and mouth of the user C are 9%, 27%, 18%, and 46%, respectively. By seeing the similarity ratio display area 330, the request user can know a ratio, which is not realized by the request user, as a ratio by which the request user prefers for each element. Next time the request user performs a search, the request user can specify the priorities in reference to content of the priority change recommendation message 320 and the similarity ratio display area 330. Only the priority change recommendation message 320 may be displayed from among the priority change recommendation message 320 and the similarity ratio display area 330.

When the similarity ratio of each element of the selected face image are far different from the priority ratio of each element, the information providing server 1 may cause the similarity ratio display area 330 to be displayed. For example, the information providing server 1 calculates a degree of difference by calculating an absolute value of a difference between the similarity ratio and the priority ratio for each element and summing up the absolute values of the differences of the elements. When the request user selects the simple information 210x whose display priority is lower than that of the simple information 210x that has not yet been selected and the degree of difference is greater than or equal to a predetermined threshold value, the information providing server 1 causes the priority change recommendation message 320 to be displayed.

When the request user selects the search result re-display link 310, the search result page is redisplayed. Here, when the request user selects the simple information 210x whose display priority is lower than that of the simple information 210x that has not yet been selected and the highest similarity element of the selected face image and the highest priority element are different from each other, the information providing server 1 causes an appearance of the simple information 210x in which the highest similarity element of the face image 211 is the same as the highest similarity element of the selected face image to be different from appearances of the other pieces of the simple information 210x. Thereby, the request user can easily find a face image in which the element that is preferred but is not realized by the request user is similar to the reference face image.

Figure 7:
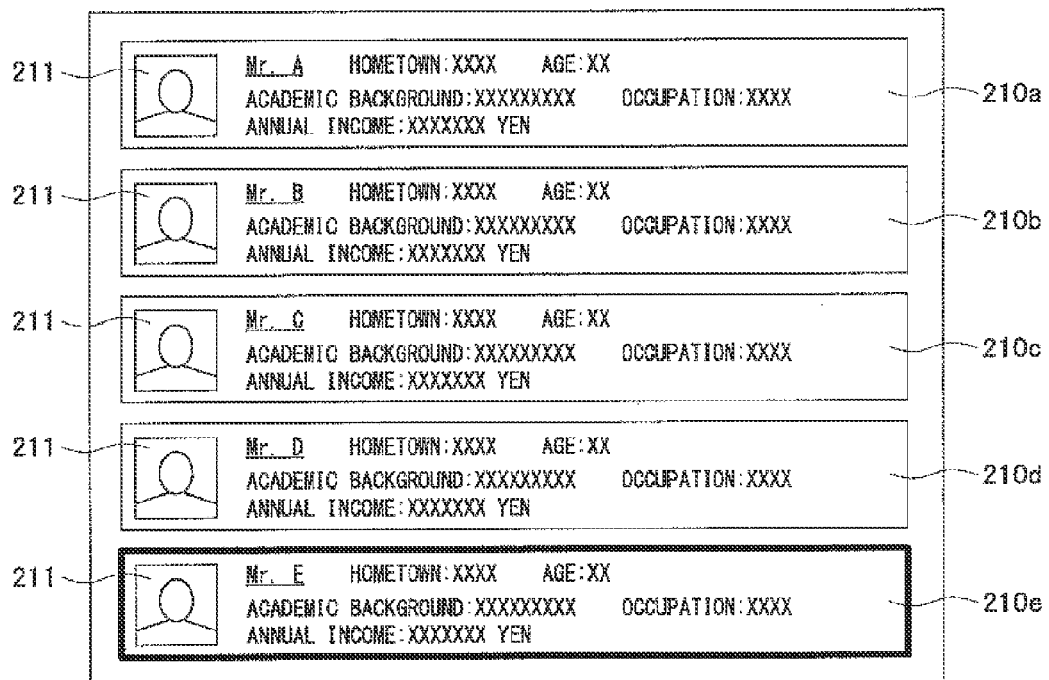
FIG. 7 is a diagram showing a re-display example of the search result page after the detailed result page is displayed.

FIG. 7 is a diagram showing a re-display example of the search result page after the detailed result page of the user C is displayed. Among the users A, B, D, and E, the user whose highest similarity element is mouth is the user E. Therefore, as shown in FIG. 7, for example, the frame of the simple information 210e is thicker than the frames of the simple information 210a to 210d. Basically, the appearance of the simple information 210x in which the highest similarity element of the face image 211 is the same as the highest similarity element of the selected face image is changed to an appearance that can be easily visually recognized by a user. The method of changing the appearance is not limited to this. For example, a color of an area of the simple information 210x, a size of the simple information 210x, a color of characters, a size of characters, or a font style may be changed or the simple information 210x may be flickered. When the search result page is redisplayed, the priority change recommendation message 320 and the similarity ratio display area 330 may be displayed in the search result page.

When the similarity ratio of each element of the selected face image are far different from the priority ratio of each element, the information providing server 1 may cause the appearance of the simple information 210x in which the similarity ratio of each element of the face image 211 are similar to the similarity ratio of each element of the selected face image to be different from the appearances of the other pieces of the simple information 210x.

The information providing server 1 may set an initial value of the priority in advance in each priority input area 131 in the priority setting area 130 in the search condition specification page on the basis of the priority specified in the past for each element by the request user. It is considered that there is a tendency of specifying the priority for each user. Therefore, the information providing server 1 sets a high priority for an element for which the request user specified a high priority in the past and sets a low priority for an element for which the request user specified a low priority in the past. The priorities are automatically set, so that the request user can save time and effort to set the priorities in the search condition specification page. The request user can change the set priorities.

1-2. Configuration of Information Providing Server

Next, a configuration of the information providing server 1 will be described with reference to FIGS. 8 and 9.

Figure 8:
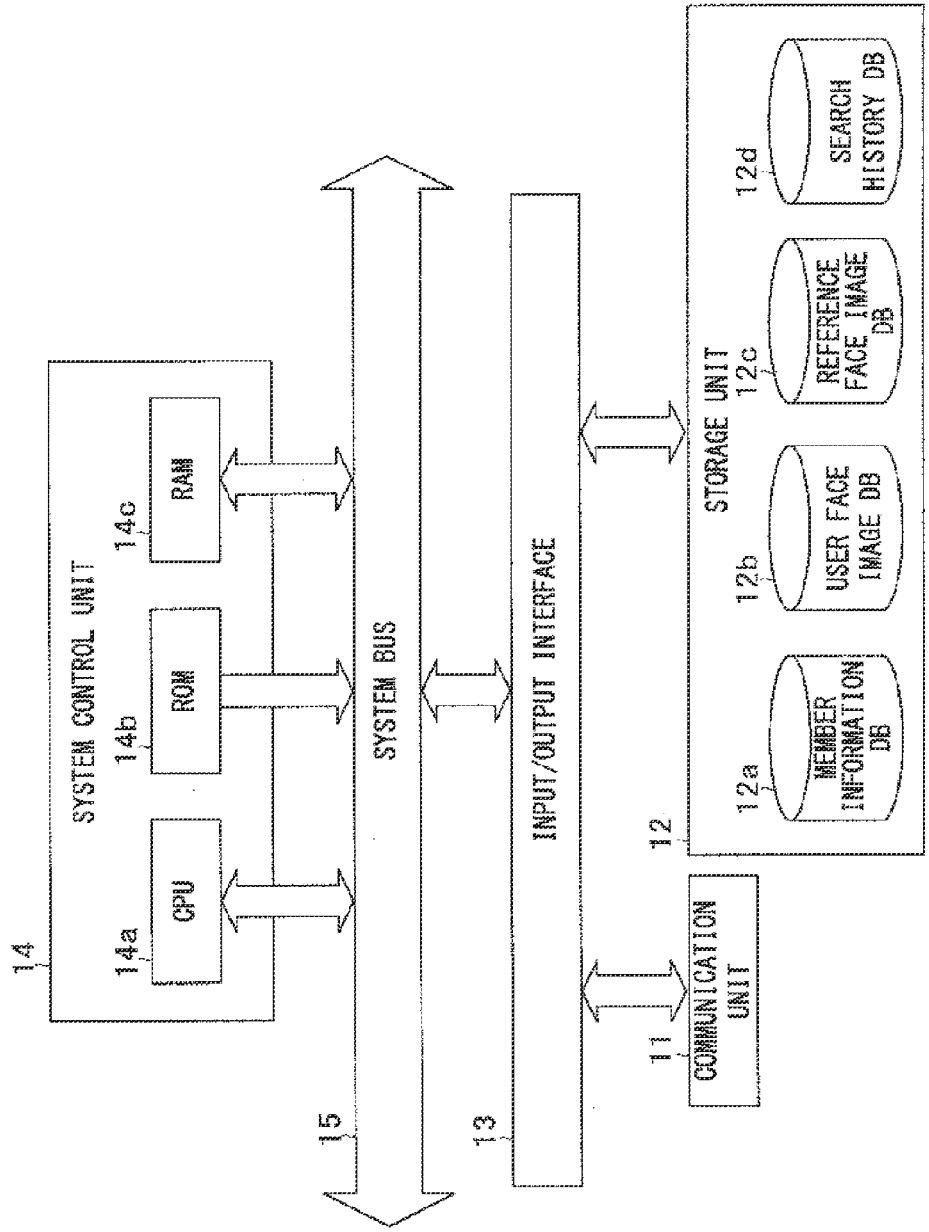
FIG. 8 is a block diagram showing an example of a schematic configuration of the information providing server 1 according to an embodiment.

FIG. 8 is a block diagram showing an example of a schematic configuration of the information providing server 1 according to the present embodiment. As shown in FIG. 8, the information providing server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the user terminals 2 and the like.

The storage unit 12 includes, for example, a hard disk drive and the like. The storage unit 12 is an example of a storage means of the present invention. In the storage unit 12, databases such as a member information DB 12a, a user face image DB 12b, a reference face image DB 12c, and a search history DB 12d are constructed.

FIG. 9A is a diagram showing an example of content registered in the member information DB 12a. In the member information DB 12a, member information related to users who register with the information providing site as a member is registered. Specifically, in the member information DB 12a, user attributes such as a user ID, a password, a nickname, a name, a date of birth, a gender, a postal code, an address, a phone number, an email address and a profile are registered in association with each other for each user.

FIG. 9B is a diagram showing an example of content registered in the user face image DB 12b. In the user face image DB 12b, a face image of each user is registered. Specifically, in the user face image DB 12b, a user ID and image data of a face image are registered in association with each other for each user. The user ID indicates a user whose face is represented by the face image.

FIG. 9C is a diagram showing an example of content registered in the reference face image DB 12c. In the reference face image DB 12c, face images specified as reference face images in the past are registered. Specifically, in the reference face image DB 12c, an image ID and image data of a face image are registered in association with each other for each face image. The image ID is identification information of the face image.

FIG. 9D is a diagram showing an example of content registered in the search history DB 12d. In the search history DB 12d, a search history including a search condition specified by a user is registered. Specifically, in the search history DB 12d, a user ID, a date and time of search, an image ID, and priorities of respective elements are registered for each search. The user ID indicates a user who requests the search. The image ID indicates a face image specified as the reference face image. The search history is an example of a history of specification of the present invention.

Next, other information stored in the storage unit 12 will be described. The storage unit 12 stores various data, such as HTML (HyperText Markup Language) documents, XML (Extensible Markup Language) documents, image data, text data, and electronic documents, for displaying a web pages. The storage unit 12 also stores various set values.

Further, the storage unit 12 stores various programs such as an operating system, a WWW (World Wide Web) server program, a DBMS (Database Management System), and an information providing management program. The information providing management program is a program for performing processes such as searching for users. The information providing management program is an example of an information processing program of the present invention. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU 14a, a ROM (Read Only Memory) 14b, a RAM (Random Access Memory) 14c, and the like. In the system control unit 14, the CPU 14a reads and executes various programs, so that the system control unit 14 functions as a priority identification means, a first extraction means, a presentation order decision means, a presentation information identification means, a first determination means, a second determination means, a first presentation means, a second presentation means, an appearance control means, a second extraction means, a priority decision means, a display control means, and a third extraction means of the present invention.

The information providing server 1 may include a plurality of server devices. For example, a server device that performs the search, a server device that transmits a web page in response to a request from the user terminal 2, a server device that manages databases, and the like may be connected to each other by a LAN or the like.

1-3. Operation of Information Processing System

FIG. 10 is a flowchart showing a process example of a search condition specification page transmission process of the system control unit 14 of the information providing server 1 according to the present embodiment. The search condition specification page transmission process is started when the information providing server 1 receives a search condition specification page request transmitted from the user terminal 2. The search condition specification page request includes a user ID of the request user who uses the user terminal 2 which transmits the request.

As shown in FIG. 10, the system control unit 14 searches the search history DB 12d for a search histories including the user ID of the request user (step S1). At this time, the system control unit 14 may limit a range of date and time of search which is to be searched for. Next, the system control unit 14 functioning as a priority decision means calculates for each element an average value of priorities set in a found search histories (step S2). Next, the system control unit 14 functioning as a display control means generates an HTML document of a search condition specification page (step S3). Specifically, the system control unit 14 generates the HTML document so that each calculated average value is set as an initial value in the priority input area 131 of a corresponding element. For example, the system control unit 14 sets a value attribute of an input tag of the priority input area 131 to the average value. The system control unit 14 functioning as a display control means transmits the generated HTML document to the user terminal 2 that is the transmission source of the request. After completing this process, the system control unit 14 ends the search condition specification page transmission process.

Figure 11:
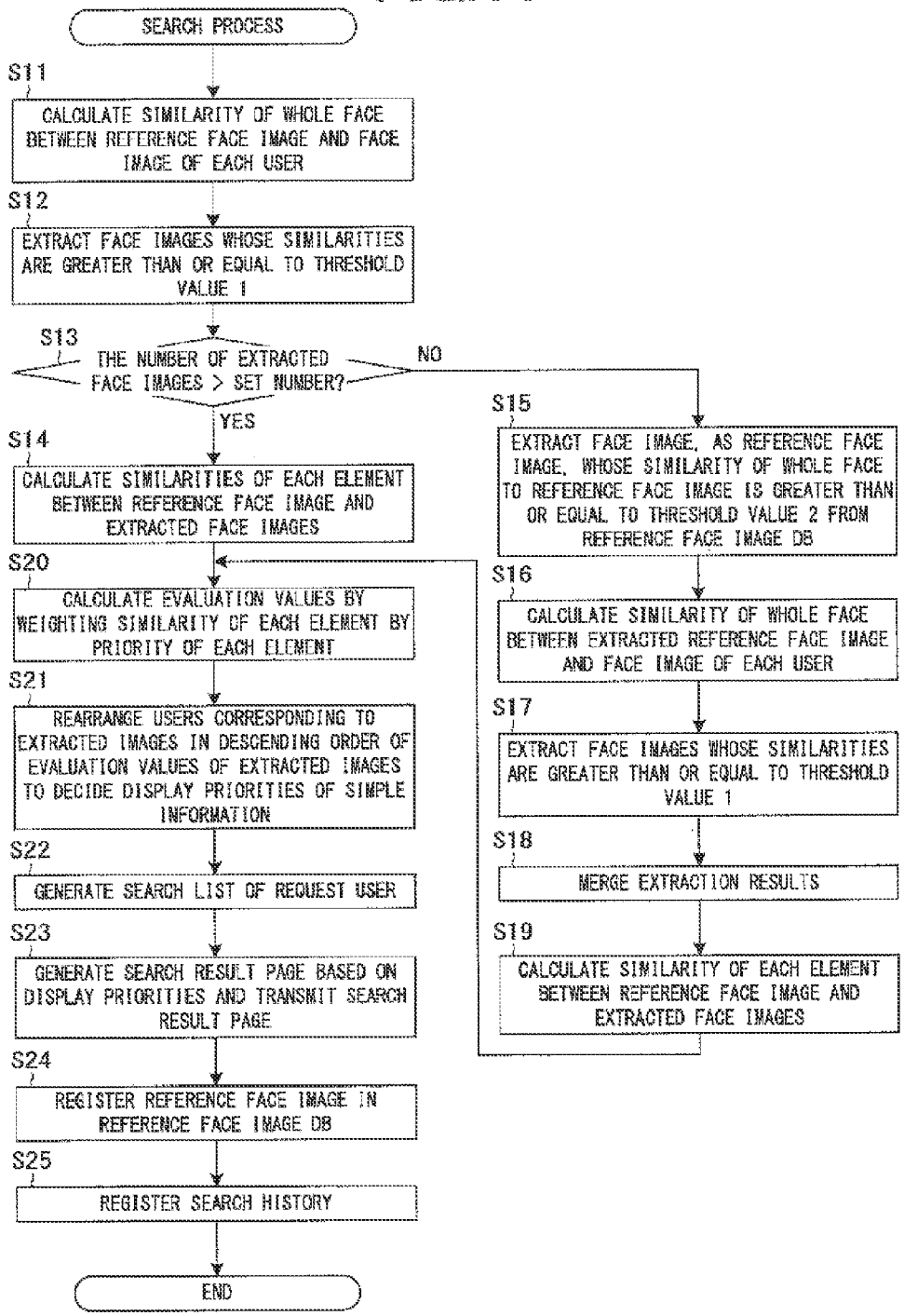
FIG. 11 is a flowchart showing a process example of a search process of the system control unit 14 of the information providing server 1 according to an embodiment.

FIG. 11 is a flowchart showing a process example of the search process of the system control unit 14 of the information providing server 1 according to the present embodiment. When the request user selects the search button 140 in the search condition specification page, the user terminal 2 transmits a search request to the information providing server 1. The search request includes a reference face image specified by the request user, the priority of each element, and the user ID of the request user. The search process is started when the information providing server 1 receives the search request. The system control unit 14 functioning as a priority identification means acquires and identifies the priority of each element by receiving the search request.

As shown in FIG. 11, the system control unit 14 calculates similarities of a whole face between the reference face image specified by the request user and the face images registered in the user face image DB 12b (step S11). The calculation method of the similarity of the whole face between face images is publicly known, so that the description of a detailed process is omitted. Next, the system control unit 14 functioning as a first extraction means extracts face images, as the extracted face images, whose similarities are greater than or equal to a predetermined threshold value 1 from among the face images registered in the user face image DB 12b (step S12). Next, the system control unit 14 determines whether or not the number of the extracted face images is greater than a set number that is set in advance (step S13). At this time, if the system control unit 14 determines that the number of the extracted face images is greater than the set number (step S13: YES), the system control unit 14 proceeds to step S14. On the other hand, if the system control unit 14 determines that the number of the extracted face images is smaller than or equal to the set number (step S13: NO), the system control unit 14 proceeds to step S15.

In step S14, the system control unit 14 calculates the similarities of each element between the reference face image and the extracted face images. Next, the system control unit 14 proceeds to step S20. The calculation method of the similarity of each element between face images is publicly known, so that the description of a detailed process is omitted.

In step S15, the system control unit 14 calculates the similarities of the whole face between the reference face image and the face images registered in the reference face image DB 12c. Then, the system control unit 14 functioning as a second extraction means extracts a face image, as the reference face image, whose similarity is greater than or equal to a predetermined threshold value 2 from among the face images registered in the reference face image DB 12c.

Next, the system control unit 14 calculates the similarities of the whole face between the extracted reference face image and the face images registered in the user face image DB 12b (step S16). At this time, if a plurality of reference face images are found, the system control unit 14 calculates, for each face image registered in the user face image DB 12b, the similarity between a face image registered in the user face image DB 12b and each of the plurality of reference face images. Then, the system control unit 14 determines the highest similarity among a plurality of calculated similarities as a final similarity. Next, the system control unit 14 extracts face images, as the extracted face images, whose similarity is greater than or equal to a predetermined threshold value 1 from among the face images registered in the user face image DB 12b (step S17).

Next, the system control unit 14 merges an extraction result in step S12 and an extraction result in step S17 to generate a final extraction result (step S18). Next, the system control unit 14 calculates the similarities of each element between the reference face image and the extracted face images (step S19). At this time, the system control unit 14 calculates the similarity of each element of the face images extracted in step S12 by using the reference face image specified by the request user. On the other hand, the system control unit 14 calculates the similarity of each element of the face images extracted in step S17 by using the reference face image extracted in step S15. Next, the system control unit 14 proceeds to step S20.

In step S20, the system control unit 14 calculates evaluation values of the extracted face images by weighting the similarity of each element by each priority specified by the request user. Next, the system control unit 14 functioning as a presentation order decision means rearranges the user IDs of the users corresponding to the extracted face images in descending order of the evaluation values of the extracted face images to decide the display priorities (step S21). Next, the system control unit 14 generates a search list (step S22). The search list is a list of the found users. In the search list, the user ID, the display priority, the similarity of each element, and a selection flag are registered for each user. The selection flag is information indicating whether or not the simple information 210x is selected. The initial value of the selection flag is FALSE. The system control unit 14 stores the generated search list in the storage unit 12 in association with the user ID of the request user.

Next, the system control unit 14 generates an HTML document of a search result page in which pieces of the simple information 210x of the found users are displayed in descending order of the display priority (step S23). Then, the system control unit 14 transmits the generated HTML document to the user terminal 2 that is the transmission source of the request.

Next, the system control unit 14 registers the reference face image in the reference face image DB 12c in association with a new image ID (step S24). Next, the system control unit 14 registers a search history (step S25). Specifically, the system control unit 14 registers the search history including the user ID of the request user, the image ID of the reference face image, and the priority of each element specified by the request user in search history DB 12d. After completing this process, the system control unit 14 ends the search process.

Figure 12:
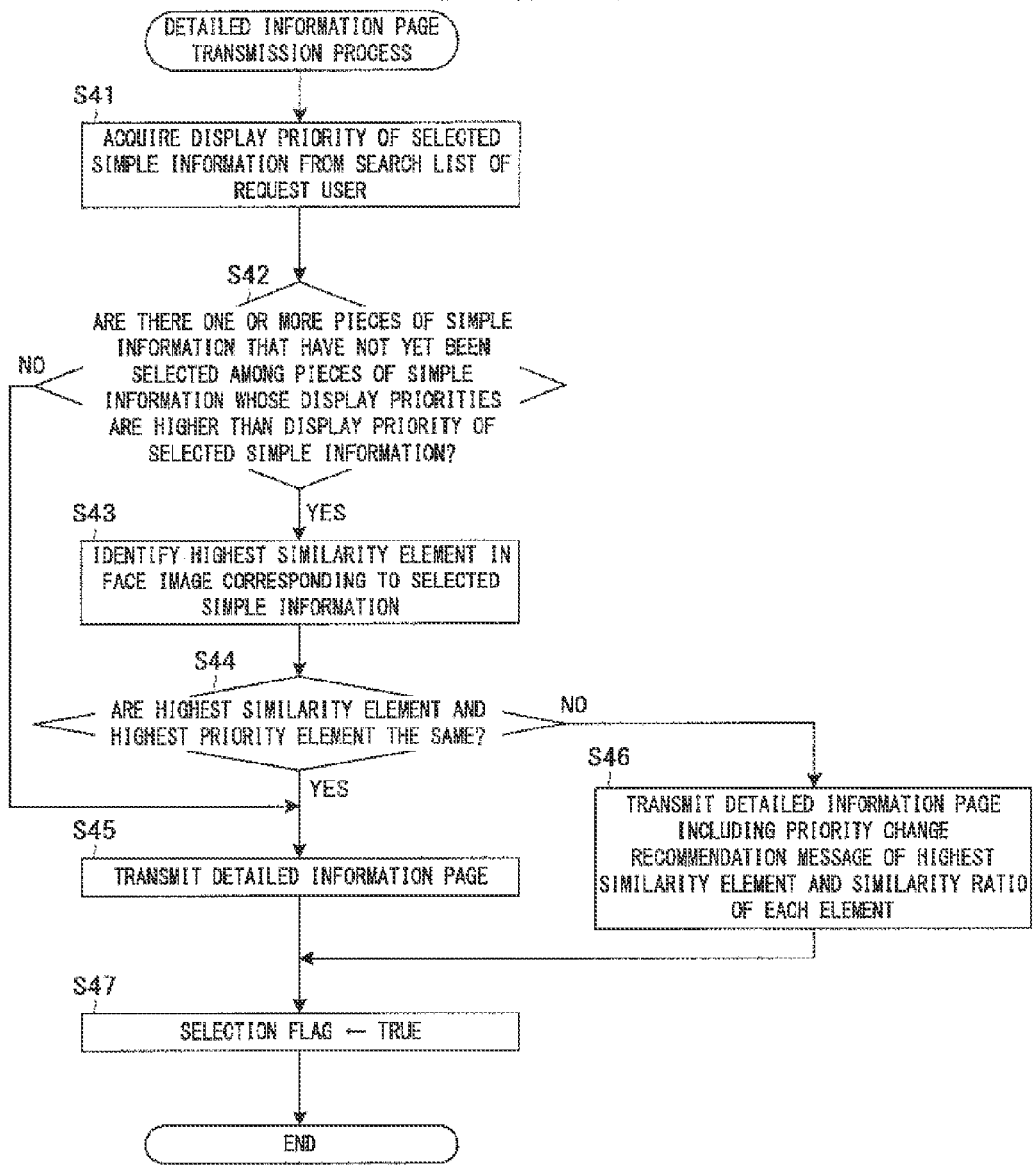
FIG. 12 is a flowchart showing a process example of a detailed information page transmission process of the system control unit 14 of the information providing server 1 according to an embodiment.

FIG. 12 is a flowchart showing a process example of a detailed information page transmission process of the system control unit 14 of the information providing server 1 according to the present embodiment. When the request user selects any one of pieces of the simple information 210x in the search result page, the user terminal 2 transmits a detailed information page request to the information providing server 1. The detailed information page request includes the user ID of the user corresponding to the selected simple information 210x and the user ID of the request user. The detailed information page transmission process is started when the information providing server 1 receives the detailed information page request. The system control unit 14 functioning as a presentation information identification means identifies the selected simple information 210x by acquiring the user ID of the user corresponding to the selected simple information 210x from the detailed information page request.

As shown in FIG. 12, the system control unit 14 acquires the display priority of the selected simple information 210x (step S41). Specifically, the system control unit 14 acquires the display priority corresponding to the user ID of the user corresponding to the selected simple information 210x from the search list corresponding to the user ID of the request user. Next, the system control unit 14 functioning as a first determination means determines whether or not there are one or more pieces of the simple information that have not yet been selected among pieces of the simple information 210x whose display priorities are higher than the display priority of the selected simple information 210x (step S42). Specifically, the system control unit 14 determines whether or not TRUE is set in the selection flag corresponding to each of all display priorities higher than the acquired display priority, in the search list. At this time, if TRUE is set in all the selection flags, the system control unit 14 determines that there is no piece of the simple information that has not yet been selected among pieces of the simple information 210x whose display priorities are higher than the display priority of the selected simple information 210x (step S42: NO). In this case, the system control unit 14 proceeds to step S45. On the other hand, if FALSE is set in at least one selection flag, the system control unit 14 determines that there are one or more pieces of the simple information that have not yet been selected among pieces of the simple information 210x whose display priorities are higher than the display priority of the selected simple information 210x (step S42: YES). In this case, the system control unit 14 proceeds to step S43.

In step S43, the system control unit 14 identifies the highest similarity element of the selected face image. Next, the system control unit 14 functioning as a second determination means determines whether or not the highest similarity element and the highest priority element are the same (step S44). At this time, if the system control unit 14 determines that the highest similarity element and the highest priority element are the same (step S44: YES), the system control unit 14 proceeds to step S45. On the other hand, if the system control unit 14 determines that the highest similarity element and the highest priority element are different from each other (step S44: NO), the system control unit 14 proceeds to step S46. The system control unit 14 may perform the determination of step S44 first and then perform the determination of step S42.

In step S45, the system control unit 14 acquires an HTML document of a detailed information page of the user corresponding to the selected simple information 210x from the storage unit 12. Then, the system control unit 14 transmits the acquired HTML document to the user terminal 2 that is the transmission source of the request. Next, the system control unit 14 proceeds to step S47. The user terminal 2 that receives the HTML document displays the detailed information page based on the received HTML document. In the detailed information page in this case, neither the priority change recommendation message 320 nor the similarity ratio display area 330 is displayed.

In step S46, the system control unit 14 acquires an HTML document of a detailed information page of the user corresponding to the selected simple information 210x from the storage unit 12. Next, the system control unit 14 functioning as a first presentation means and a second presentation means sets information in the acquired HTML document so that the priority change recommendation message 320 and the similarity ratio display area 330 are displayed. By this process, the system control unit 14 causes the user terminal 2 to present the priority change recommendation message 320 and the similarity ratio display area 330 to the user. Then, the system control unit 14 transmits the HTML document in which the information is set to the user terminal 2 that is the transmission source of the request. Next, the system control unit 14 proceeds to step S47. The user terminal 2 that receives the HTML document displays the detailed information page based on the received HTML document. In the detailed information page in this case, as shown in FIG. 6, the priority change recommendation message 320 and the similarity ratio display area 330 are displayed.

In step S47, the system control unit 14 sets the selection flag corresponding to the user ID of the user corresponding to the selected simple information 210x to TRUE in the search list corresponding to the user ID of the request user. After completing this process, the system control unit 14 ends the detailed information page transmission process.

Figure 13:
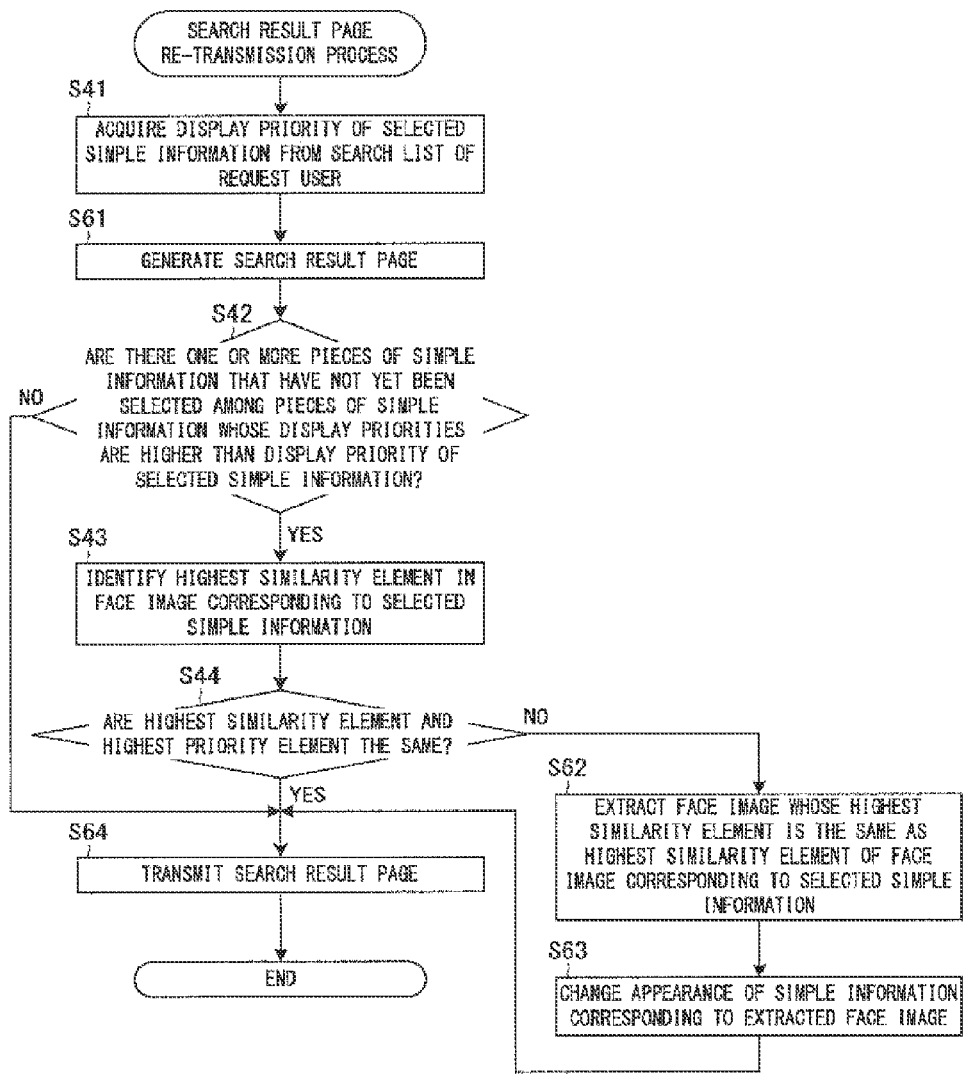
FIG. 13 is a flowchart showing a process example of a search result page re-transmission process of the system control unit 14 of the information providing server 1 according to an embodiment.

FIG. 13 is a flowchart showing a process example of a search result page re-transmission process of the system control unit 14 of the information providing server 1 according to the present embodiment. In FIG. 13, the same processes as those in FIG. 12 are denoted by the same reference numerals. When the request user selects the search result re-display link 310 in the detailed information page, the user terminal 2 transmits a search result page re-transmission request to the information providing server 1. The search result page re-transmission request includes the user ID of the user whose information is displayed in the detailed information page (the user corresponding to the selected simple information 210x) and the user ID of the request user. The search result page re-transmission process is started when the information providing server 1 receives the search result page re-transmission request.

As shown in FIG. 13, the system control unit 14 performs step S41 and then generates an HTML document of the search result page based on the search list corresponding to the user ID of the request user (step S61). Next, the system control unit 14 performs steps S42 to S44. In step S42, if the system control unit 14 determines that there is no piece of the simple information that has not yet been selected among pieces of the simple information 210x whose display priorities are higher than the display priority of the selected simple information 210x (step S42: NO), the system control unit 14 proceeds to step S64. In step S44, if the system control unit 14 determines that the highest similarity element and the highest priority element are the same (step S44: YES), the system control unit 14 proceeds to step S64. On the other hand, if the system control unit 14 determines that the highest similarity element and the highest priority element are different from each other (step S44: NO), the system control unit 14 proceeds to step S62.

In step S62, on the basis of the search list corresponding to the request user, the system control unit 14 extracts, from among face images corresponding to the simple information 210x displayed in the search result page, a face image whose highest similarity element is the same as the highest similarity element of the selected face image. At this time, the selected face image is excluded from the face image to be extracted. Next, the system control unit 14 functioning as an appearance control means changes the appearance of the simple information 210x corresponding to the extracted face image by rewriting the HTML document of the search result page (step S63). Next, the system control unit 14 proceeds to step S64.

In step S64, the system control unit 14 transmits the HTML document of the search result page to the user terminal 2 that is the transmission source of the request. After completing this process, the system control unit 14 ends the search result page re-transmission process. The user terminal 2 displays the search result page as shown in FIG. 5 or the search result page as shown in FIG. 7 based on the received HTML document.

As described above, according to the present embodiment, the system control unit 14 identifies the priorities, each of which is the priority of each of a plurality of elements included in a face in the reference face image and is according to the specification of the user, extracts face images whose similarities of an area including the plurality of elements to the reference face image are greater than or equal to the threshold value 1 from among a plurality of face images registered in the user face image DB 12b, and decides the display priorities of pieces of the simple information 210x displayed corresponding to the extracted face images as search results, on the basis of the similarities of each element between the reference face image and the extracted face images and the priority of each element. Therefore, it is possible to cause information to be presented by prioritizing a face element preferred by the user from among faces preferred by the user.

Further, the system control unit 14 identifies the simple information 210x selected by the user from among a plurality of displayed pieces of the simple information 210x, determines whether or not the simple information 210x whose display priority is decided to be lower than that of the simple information 210x that has not yet been selected is selected, determines whether or not the highest similarity element of the face image corresponding to the selected simple information 210x and the highest priority element are different from each other, and causes the priority change recommendation message 320 to be displayed when it is determined that the simple information 210x whose display priority is lower than that of the simple information 210x that has not yet been selected is selected and it is determined that the highest similarity element and the highest priority element are different from each other. Therefore, the user can know the element preferred but not realized by the user.

Further, the system control unit 14 causes the similarity ratio display area 330 to be displayed when it is determined that the simple information 210x whose display priority is lower than that of the simple information 210x that has not yet been selected is selected and it is determined that the highest similarity element and the highest priority element are different from each other. Therefore, the user can know the ratio of preference for each element, which is not realized by the user.

Further, when it is determined that the simple information 210x whose display priority is lower than that of the simple information 210x that has not yet been selected is selected and it is determined that the highest similarity element and the highest priority element are different from each other, the system control unit 14 causes a appearance of the simple information 210x corresponding to the face image, among a plurality of pieces of the simple information 210x, whose highest similarity element is the same as that of the selected face image to be different from appearances of the other pieces of the simple information 210x. Therefore, the user can easily find a face image including an element preferred but not realized by the user.

Further, the system control unit 14 extracts face images similar to the reference face image as a whole by using a face image specified by the user as the reference face image, and when the number of extracted face images is smaller than or equal to the set number, the system control unit 14 extracts a face image whose similarity to the face image specified by the user is greater than or equal to the threshold value 2 from among face images specified as the reference image in the past, and further uses the extracted face image as the reference image. Therefore, even when a sufficient number of face images cannot be extracted by using only the reference face image specified by the user, the user can extract face images similar to the preference of the user.

Further, the system control unit 14 decides the priority of each element based on the search history of the request user stored in the storage unit 12 and causes the priority setting area 130 including a plurality of priority input areas 131, in each of which the decided priority of each element is set, to be displayed. Therefore, it is possible to reduce the time and effort for the user to specify the priorities.

The information providing server 1 need not perform the rearrangement based on the evaluation values in the search process. Instead, when the user performs an operation to request the rearrangement in the search result page, the information providing server 1 may perform the rearrangement based on the evaluation values and transmit a search result page according to a result of the rearrangement to the user terminal 2.

Next, another example will be described which automatically sets the priority in each priority input area 131 in the priority setting area 130 of the search condition specification page. The information providing server 1 may extract, from among the face images specified in the past as the reference images by the request user, face images similar to the reference face image specified this time. Then, the information providing server 1 may determine that priorities which were specified by the request user together with the extracted face image at the time when the request user specified the extracted face image as the reference face image is initial values and set the initial values in the priority input areas 131. This is because there is a high probability that when the request user specifies a reference face image similar to a reference face image which the request user specified in the past, the request user specifies again the same priorities as those specified together with the reference face image specified in the past.

Figure 14:
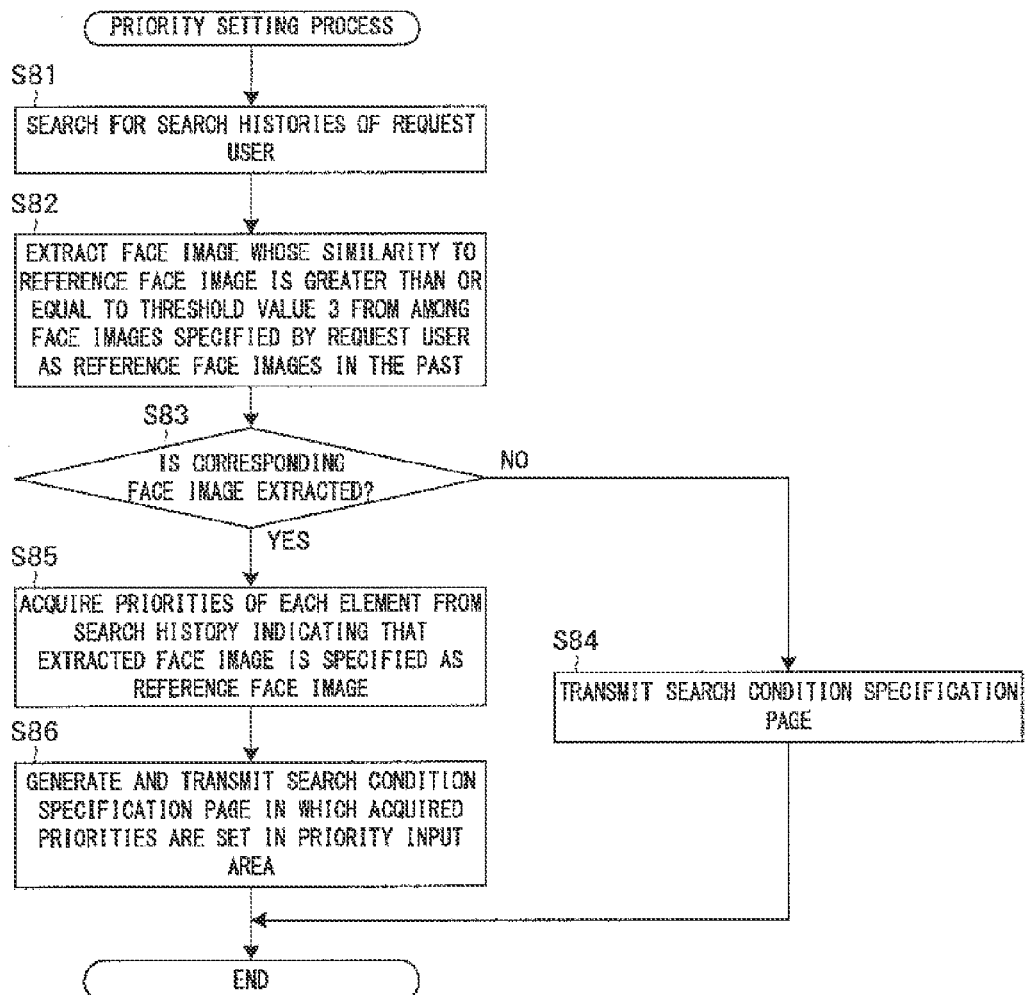
FIG. 14 is a flowchart showing a process example of a priority setting process of the system control unit 14 of the information providing server 1 according to an embodiment.

FIG. 14 is a flowchart showing a process example of a priority setting process of the system control unit 14 of the information providing server 1 according to the present embodiment. The request user selects the reference face image specification button 120 on the search condition specification page to specify the reference face image. Then, the user terminal 2 transmits a reference face image reflection request to the information providing server 1. The reference face image reflection request includes the specified reference face image and the user ID of the request user. The priority setting process is started when the information providing server 1 receives the reference face image reflection request.

As shown in FIG. 14, the system control unit 14 searches the search history DB 12d for search histories including the user ID of the request user (step S81). Next, the system control unit 14 acquires, from the reference face image DB 12c, face images corresponding to the image IDs set in found search histories. The face images acquired from the reference face image DB 12c are the reference face images specified by the request user in the past. Next, the system control unit 14 calculates the similarities of the whole face between the reference face image specified at this time by the request user and the face images specified as the reference face images in the past by the request user. Then, the system control unit 14 functioning as a third extraction means extracts a face image whose similarity is greater than or equal to a predetermined threshold value 3 from among the face images specified as the reference face images in the past (step S82). Next, the system control unit 14 determines whether or not a corresponding face image can be extracted (step S83). At this time, if the system control unit 14 determines that no corresponding face image can be extracted (step S83: NO), the system control unit 14 proceeds to step S84. On the other hand, if the system control unit 14 determines that a corresponding face image can be extracted (step S83: YES), the system control unit 14 proceeds to step S85.

In step S84, the system control unit 14 transmits an HTML document of a search condition specification page in which the reference face image specified at this time is displayed in the reference face image display area 110 to the user terminal 2. After completing this process, the system control unit 14 ends the priority setting process.

In step S85, the system control unit 14 acquires the priorities of each element from the search history indicating that the extracted face image is specified as the reference face image. Next, the system control unit 14 functioning as a display control means generates an HTML document of a search condition specification page (step S86). Specifically, the system control unit 14 generates the HTML document so that each acquired priority is set as an initial value in the priority input area 131 of a corresponding element. Further, the system control unit 14 performs setting so that the reference face image specified at this time is displayed in the reference face image display area 110. The system control unit 14 functioning as a display control means transmits the generated HTML document to the user terminal 2 that is the transmission source of the request. After completing this process, the system control unit 14 ends the priority setting process. When there is a plurality of face images similar to the reference face image specified at this time, for example, the system control unit 14 may set priorities which were specified at the time when the face image whose similarity is the highest was specified as the reference face image. Alternatively, the system control unit 14 may set average values of priorities which were specified together with the plurality of similar face images at the time when the plurality of similar face images were specified.

As described above, according to the present modified example, the system control unit 14 extracts a face image whose similarity to the face image specified at this time by the user as the reference image is greater than or equal to the threshold value 3 from the face images that were specified as the reference images in the past by the user and causes the priority setting area 130 including a plurality of priority input areas 131, in each of which the priority of each element specified in the past by the user together with the extracted face image is set, to be displayed. Therefore, it is possible to reduce the time and effort for the user to specify the priorities.

2. Second Embodiment

Next, an overview of a second embodiment will be described with reference to FIG. 15. In the second embodiment, a method of extracting face images similar to the reference face image and a method of rearranging related information 210 are different from those of the first embodiment. FIG. 15 is a diagram showing an example of an overview of a process of the information providing server 1 according to the present embodiment. Description of the same points as those in the first embodiment will be omitted.

When the information providing server 1 is requested to perform search, the information providing server 1 compares the reference face image with a user's face images for each element (FIG. 15 (1)). Next, the information providing server 1 calculates an evaluation value for each face image on the basis of the similarity of each element and the priority for each element specified by the request user. Then, the information providing server 1 extracts user's face images whose evaluation value is greater than or equal to a threshold value as extracted face images (FIG. 15 (2)). Next, the information providing server 1 compares a whole face of the reference face image with whole faces of the extracted face images (FIG. 15 (3)). Then, the information providing server 1 rearranges search results on the basis of the similarities between the whole face of the reference face image and the whole faces of the extracted face images (FIG. 15 (4)). Specifically, the information providing server 1 determines display priorities so that the higher the similarity of a face image, the higher the display priority of the simple information 210x corresponding to the face image. Thereby, the information providing server 1 can cause information to be presented by prioritizing a face preferred by the request user from among faces including an element preferred by the request user.

FIG. 16 is a flowchart showing a process example of a search process of the system control unit 14 of the information providing server 1 according to the present embodiment. In FIG. 16, the same processes as those in FIG. 11 are denoted by the same reference numerals.

As shown in FIG. 16, the system control unit 14 calculates the similarities of each element between the specified reference face image and the face images registered in the user face image DB 12b (step S101). Next, the system control unit 14 calculates evaluation values of the extracted face images by weighting the similarity of each element by each priority specified by the request user (step S102). Next, the system control unit 14 extracts face images, as the extracted face images, whose evaluation values are greater than or equal to a predetermined threshold value 4 from among the face images registered in the user face image DB 12b (step S103). Next, the system control unit 14 determines whether or not the number of the extracted face images is greater than a set number that is set in advance (step S13). At this time, if the system control unit 14 determines that the number of the extracted face images is greater than the set number (step S13: YES), the system control unit 14 proceeds to step S105. On the other hand, if the system control unit 14 determines that the number of the extracted face images is smaller than or equal to the set number (step S13: NO), the system control unit 14 proceeds to step S15.

In step S105, the system control unit 14 calculates the similarities of a whole face between the reference face image and the extracted face images. Next, the system control unit 14 proceeds to step S111.

After performing step S15, the system control unit 14 calculates the similarities of each element between the extracted reference face image and the face images registered in the user face image DB 12b (step S106). At this time, if a plurality of reference face images are found, the system control unit 14 calculates for each face image registered in the user face image DB 12b the similarity between a face image registered in the user face image DB 12b and each of the plurality of reference face images. Next, the system control unit 14 calculates an evaluation value by weighting the similarity of each element by each priority specified by the request user (step S107). At this time, if a plurality of reference face images are found, the system control unit 14 determines the highest evaluation value as a final similarity among the calculated evaluation values. Next, the system control unit 14 extracts face images, as the extracted face images, whose evaluation values are greater than or equal to the threshold value 4 from among the face images registered in the user face image DB 12b (step S108). Next, the system control unit 14 merges an extraction result in step S103 and an extraction result in step S108 to generate a final extraction result (step S109). Next, the system control unit 14 calculates the similarity of a whole face between the reference face image and the extracted face images (step S110). Next, the system control unit 14 proceeds to step S111.

In step S111, the system control unit 14 rearranges the user IDs of the users corresponding to the extracted face images in descending order of the similarities of the extracted face images to decide the display priorities. Next, the system control unit 14 performs steps S22 to S25.

The content of the search condition specification page transmission process and the priority setting process is the same as that in the first embodiment.

As described above, according to the present embodiment, the system control unit 14 identifies the priorities, each of which is the priority of each of a plurality of elements included in a face in the reference face image and is according to the specification of the user, extracts face images whose similarities based on the similarity of each element to the reference face image and the priority of each element from among a plurality of face images registered in the user face image DB 12b are greater than or equal to the threshold value 4, and decides the display priorities of pieces of the simple information 210x presented as search results corresponding to the extracted face images on the basis of the similarities of a area including a plurality of elements between the reference face image and the extracted face images. Therefore, it is possible to cause information to be presented by prioritizing a face preferred by the user from among faces including an element preferred by the user.

In the embodiments described above, face images of found users are displayed in the search result page. However, the face images need not be displayed. In the embodiments described above, when the simple information 210x is selected, the information providing server 1 causes the user terminal 2 to display the detailed information page. However, the process content of the information providing server 1 performed when the simple information 210x is selected is not limited to displaying the detailed information page. The threshold values 1 to 4 may be the same or different from each other.

In the embodiments described above, the user specifies the priority for each element. However, the information providing server 1 may be configured so that the user can specify an element with the highest priority of the user. Then, the information providing server 1 may identify the priority of each element according to the specification of the element with the highest priority of the user. For example, the information providing server 1 may determine the priority of the element with the highest priority of the user as 100% and the priorities of the other elements as 0%.

REFERENCE SIGNS LIST

1 Information providing server
2 User terminal
11 Communication unit
12 Storage unit
12a Member information DB
12b User face image DB
12c Reference face image DB
12d Search history DB
13 Input/output interface
14 System control unit
14a CPU
14b ROM
14c RAM
15 System bus
NW Network
S Information processing system

The invention claimed is:

1. An information processing apparatus comprising:
   at least one non-transitory memory operable to store program code;
   at least one processor operable to read said program code and operate as instructed by said program code, said program code comprising:
   priority identification code that causes the at least one processor to identify a priority of each of a plurality of elements included in a face in a reference face image, the priority being according to specification by a user;
   first extraction code that causes the at least one processor to extract face images from among a plurality of face images on the basis of first similarities or evaluation values, the first similarities being similarities of an area including the plurality of elements between the plurality of face images and the reference face image, the evaluation values being calculated by using second similarities of each element between the plurality of face images and the reference face image and the priority of each element, identified by the priority identification code; and
   presentation order determination code that causes the at least one processor to determine presentation order of presentation information presented as search results corresponding to the face images extracted by the first extraction code,
   wherein when the face images are extracted from among the plurality of face images on the basis of the first similarities by the first extraction code, the extracted face images are presented according to the presentation order that is determined on the basis of the evaluation values, and when the face images are extracted from among the plurality of face images on the basis of the evaluation values by the first extraction code, the extracted face images are presented according to the presentation order that is determined on the basis of the first similarities.

2. The information processing apparatus according to claim 1, wherein
   the first extraction code causes the at least one processor to extract face images whose first similarities of a whole of the area including the plurality of elements to the reference face image are greater than or equal to a first threshold value, the first similarities being calculated without using priorities identified by the priority identification code,
   the presentation order determination code causes the at least one processor to determine the presentation order on the basis of the second similarities of each element between the reference face image and the extracted face images and the priority of each element, and
   said program code further includes
   presentation information identification code that causes the at least one processor to identify a piece selected by a user from among a plurality of pieces of presented presentation information; and
   control code that, when an element with a highest second similarity in a face image corresponding to the piece identified by the presentation information identification code and an element with a highest priority of the priorities identified by the priority identification code are different from each other, causes the at least one processor to control display such that it is possible to identify that the element with the highest second similarity and the element with the highest priority are different.

3. The information processing apparatus according to claim 1, wherein
   the first extraction code causes the at least one processor to extract face images whose index values are greater than or equal to a second threshold value, the index values being based on the second similarities of each element to the reference face image and the priority of each element, identified by the priority identification code; and
   the presentation order determination code causes the at least one processor to determine the presentation order on the basis of the first similarities of a whole of the area including the plurality of elements between the reference face image and the extracted face images, the first similarities being calculated without using priorities identified by the priority identification code.

4. The information processing apparatus according to claim 2, wherein said program code further includes:
   first determination code that causes the at least one processor to determine whether or not the selected piece of the presentation information is a piece whose position in the presentation order is determined by the presentation order determination code to be lower than that of a piece, of the presentation information, that has not yet been selected; and
   second determination code that causes the at least one processor to determine whether or not an element with a highest similarity in a face image corresponding to the selected piece of the presentation information and an element with a highest priority of priorities identified by the priority identification code are different from each other,
   wherein the presentation information includes the face images extracted by the first extraction code, and
   when the first determination code causes the at least one processor to determine that the selected piece is the piece whose position is determined to be lower than that of the piece that has not yet been selected and the second determination code causes the at least one processor to determine that the element with the highest similarity and the element with the highest priority are different from each other, the control code causes the at least one processor to control information to be presented which recommends increasing the priority of the element with the highest similarity in the face image corresponding to the selected piece of the presentation information.

5. The information processing apparatus according to claim 4, wherein the program code further includes:
   presentation code that, when the first determination code causes the at least one processor to determine that the selected piece is the piece whose position is determined to be lower than that of the piece that has not yet been selected and the second determination code causes the at least one processor to determine that the element with the highest similarity and the element with the highest priority are different from each other, causes the at least one processor to control a ratio of a similarity of each element in the face image corresponding to the selected piece of the presentation information to be presented.

6. The information processing apparatus according to claim 2, wherein the program code further includes:
  first determination code that causes the at least one processor to determine whether or not the selected piece of the presentation information is a piece whose position in the presentation order is determined by the presentation order decision code to be lower than that of a piece, of the presentation information, that has not yet been selected; and
  second determination code that causes the at least one processor to determine whether or not an element with a highest similarity in a face image corresponding to the selected piece of the presentation information and an element with a highest priority of priorities identified by the priority identification code are different from each other,
  wherein the presentation information includes the face images extracted by the first extraction code, and
  when the first determination code causes the at least one processor to determine that the selected piece is the piece whose position is determined to be lower than that of the piece that has not yet been selected and the second determination code causes the at least one processor to determine that the element with the highest similarity and the element with the highest priority are different from each other, the control code causes the at least one processor to control an appearance of a piece, among the plurality of pieces of the presentation information, corresponding to a face image whose element with a highest similarity is the same as that of a face image corresponding to the selected piece of the presentation information to be different from appearances of the other pieces of the presentation information.

7. The information processing apparatus according to claim 1, wherein
  the first extraction code causes the at least one processor to extract face images by using a face image specified by the user as the reference face image,
  the program code further includes a second extraction code that, when the number of face images extracted by the first extraction code is smaller than or equal to a predetermined number, causes the at least one processor to extract a face image, from among face images specified as the reference face images in the past, whose similarity to the face image specified by the user is greater than or equal to a third threshold value, and
  the first extraction code causes the at least one processor to extract face images by further using the face image extracted by the second extraction code as the reference face image.

8. The information processing apparatus according to claim 2, wherein
  the first extraction code causes the at least one processor to extract face images by using a face image specified by the user as the reference face image,
  the program code further includes a second extraction code that, when the number of face images extracted by the first extraction code is smaller than or equal to a predetermined number, causes the at least one processor to extract a face image, from among face images specified as the reference face images in the past, whose similarity to the face image specified by the user is greater than or equal to a third threshold value, and
  the first extraction code causes the at least one processor to extract face images by further using the face image extracted by the second extraction code as the reference face image.

9. The information processing apparatus according to claim 3, wherein
  the first extraction code causes the at least one processor to extract face images by using a face image specified by the user as the reference face image,
  the program code further includes a second extraction code that, when the number of face images extracted by the first extraction code is smaller than or equal to a predetermined number, causes the at least one processor to extract a face image, from among face images specified as the reference face images in the past, whose similarity to the face image specified by the user is greater than or equal to a third threshold value, and
  the first extraction code causes the at least one processor to extract face images by further using the face image extracted by the second extraction code as the reference face image.

10. The information processing apparatus according to claim 1, wherein the program further includes:
  priority decision code that causes the at least one processor to determine the priority of each element on the basis of a history, stored in a storage, of priority specification of the user; and
  display control code that causes the at least one processor to control an input area in which the priority determined for each element by the priority determination code is set to be displayed as an input area for the user to specify the priority of each element,
  wherein the priority identification code causes the at least one processor to acquire the priority specified for each element in the input area.

11. The information processing apparatus according to claim 2, wherein the program code further includes:
  priority decision code that causes the at least one processor to determine the priority of each element on the basis of a history, stored in a storage, of priority specification of the user; and
  display control code that causes the at least one processor to control an input area in which the priority determined for each element by the priority decision code is set to be displayed as an input area for the user to specify the priority of each element,
  wherein the priority identification code causes the at least one processor to acquire the priority specified for each element in the input area.

12. The information processing apparatus according to claim 3, wherein the program code further includes:
  priority decision code that causes the at least one processor to determine the priority of each element on the basis of a history, stored in a storage, of priority specification of the user; and
  display control code that causes the at least one processor to control an input area in which the priority determined for each element by the priority decision code is set to be displayed as an input area for the user to specify the priority of each element,
  wherein the priority identification code causes the at least one processor to acquire the priority specified for each element in the input area.

13. The information processing apparatus according to claim 1, wherein
  the first extraction code causes the at least one processor to extract face images by using a face image, as the reference face image, specified by the user together with the priority of each element, the program code further includes
third extraction code that causes the at least one processor to extract, from among face images specified by the user in the past, a face image whose similarity to the face image specified by the user at this time is greater than or equal to a fourth threshold value, and
display control code that causes the at least one processor to control causes the at least one processor to an input area in which a priority specified for each element by the user in the past together with the face image extracted by the third extraction code is set to be displayed as an input area for the user to specify the priority of each element, and
the priority identification code causes the at least one processor to acquire the priority specified for each element in the input area.

14. The information processing apparatus according to claim 2, wherein
the first extraction code causes the at least one processor to extract face images by using a face image, as the reference face image, specified by the user together with the priority of each element,
the program code further includes
third extraction code that causes the at least one processor to extract, from among face images specified by the user in the past, a face image whose similarity to the face image specified by the user at this time is greater than or equal to a fourth threshold value, and
display control code that causes the at least one processor to control an input area in which a priority specified for each element by the user in the past together with the face image extracted by the third extraction code is set to be displayed as an input area for the user to specify the priority of each element, and
the priority identification code causes the at least one processor to acquire the priority specified for each element in the input area.

15. The information processing apparatus according to claim 3, wherein
the first extraction code causes the at least one processor to extract face images by using a face image, as the reference face image, specified by the user together with the priority of each element,
the program code further includes
third extraction code that causes the at least one processor to extract, from among face images specified by the user in the past, a face image whose similarity to the face image specified by the user at this time is greater than or equal to a fourth threshold value, and
display control code that causes the at least one processor to control an input area in which a priority specified for each element by the user in the past together with the face image extracted by the third extraction code is set to be displayed as an input area for the user to specify the priority of each element, and
the priority identification code causes the at least one processor to acquire the priority specified for each element in the input area.

16. An information processing method performed by a computer, including at least one processor, the method comprising:
identifying, using at least one of said at least one processor, a priority of each of a plurality of elements included in a face in a reference face image, the priority being according to specification by a user;
extracting, using at least one of said at least one processor, face images from among a plurality of face images on the basis of first similarities or evaluation values, the first similarities being similarities of an area including the plurality of elements between the plurality of face images and the reference face image, the evaluation values being calculated by using second similarities of each element between the plurality of face images and the reference face image and the priority of each element;
determining, using at least one of said at least one processor, presentation order of presentation information presented as search results corresponding to the extracted face images,
wherein when the face images are extracted from among the plurality of face images on the basis of the first similarities by the first extraction code, the extracted face images are presented according to the presentation order that is determined on the basis of the evaluation values, and when the face images are extracted from among the plurality of face images on the basis of the evaluation values by the first extraction code, the extracted face images are presented according to the presentation order that is determined on the basis of the first similarities.

17. A non-transitory recording medium in which an information processing program is computer-readably recorded, the information processing program causing a computer to:
identify a priority of each of a plurality of elements included in a face in a reference face image, the priority being according to specification by a user;
extract face images from among a plurality of face images on the basis of first similarities or evaluation values, the first similarities being similarities of an area including the plurality of elements between the plurality of face images and the reference face image, the evaluation values being calculated by using second similarities of each element between the plurality of face images and the reference face image and the priority of each element;
determine presentation order of presentation information presented as search results corresponding to the extracted face images,
wherein when the face images are extracted from among the plurality of face images on the basis of the first similarities by the first extraction code, the extracted face images are presented according to the presentation order that is determined on the basis of the evaluation values, and when the face images are extracted from among the plurality of face images on the basis of the evaluation values by the first extraction code, the extracted face images are presented according to the presentation order that is determined on the basis of the first similarities.

* * * * *